US010554880B2

(12) United States Patent
Yoshikawa et al.

(10) Patent No.: US 10,554,880 B2
(45) Date of Patent: Feb. 4, 2020

(54) IMAGE PROCESSING SYSTEM, IMAGING APPARATUS, IMAGE PROCESSING METHOD, AND COMPUTER-READABLE STORAGE MEDIUM

(71) Applicant: RICOH COMPANY, Ltd., Tokyo (JP)

(72) Inventors: Hiromi Yoshikawa, Kanagawa (JP); Kazuhiro Yoshida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 285 days.

(21) Appl. No.: 15/310,835

(22) PCT Filed: May 20, 2015

(86) PCT No.: PCT/JP2015/065151
§ 371 (c)(1),
(2) Date: Nov. 14, 2016

(87) PCT Pub. No.: WO2015/182626
PCT Pub. Date: Dec. 3, 2015

(65) Prior Publication Data
US 2017/0094169 A1    Mar. 30, 2017

(51) Int. Cl.
*H04N 5/225* (2006.01)
*H04N 5/232* (2006.01)
(Continued)

(52) U.S. Cl.
CPC ....... *H04N 5/23238* (2013.01); *G06T 3/4038* (2013.01); *G06T 5/006* (2013.01);
(Continued)

(58) Field of Classification Search
CPC . G06T 2207/10024; G06T 2207/20221; G06T 3/4038; G06T 5/006; G06T 5/50;
(Continued)

(56) References Cited

U.S. PATENT DOCUMENTS 6,292,593 B1 * 9/2001 Nako ...................... G06T 5/006
382/284
6,393,162 B1 * 5/2002 Higurashi ............... G06T 5/006
345/629
(Continued)

FOREIGN PATENT DOCUMENTS

CN   1701597 A   11/2005
CN   1982934 A    6/2007
(Continued)

OTHER PUBLICATIONS

Extended European Search Report dated Jun. 9, 2017 in European Patent Application No. 15799197.7.
(Continued)

*Primary Examiner* — Nathnael Aynalem
(74) *Attorney, Agent, or Firm* — Xsensus LLP

(57) ABSTRACT

An image processing system performs image processing on images including overlapping image regions as overlapping regions. The system includes a calculator configured to calculate an evaluation value for evaluating each image using pixel values of pixels in each overlapping region; a determination controller configured to determine, based on the calculated evaluation values, whether there is an image to be corrected in the images; an image determiner configured to, when there is the image to be corrected, determine a correction reference image as a reference, out of the images, based on the evaluation values; and an image corrector configured to correct the image to be corrected based on the correction reference image.

18 Claims, 28 Drawing Sheets

(51) Int. Cl.
    *G06T 3/40*     (2006.01)
    *G06T 5/00*     (2006.01)
(52) U.S. Cl.
    CPC ......... *H04N 5/2254* (2013.01); *H04N 5/2258* (2013.01); *G06T 2207/10024* (2013.01); *G06T 2207/20221* (2013.01)
(58) Field of Classification Search
    CPC ..... G06T 2200/32; G06T 7/174; G06T 7/251; G06T 7/32; G06T 7/33; H04N 5/2254; H04N 5/2258; H04N 5/23238; H04N 5/2621; H04N 5/2624; H04N 7/181; H04N 5/265; H04N 5/3415; H04N 5/247; G06K 9/6202; G06K 9/6269; G03B 37/04
    USPC ................. 348/36, 38, 584; 345/629
    See application file for complete search history.

(56)     References Cited

U.S. PATENT DOCUMENTS

| | | | |
|---|---|---|---|
| 8,009,927 | B2 | 8/2011 | Manabe |
| 8,126,285 | B2 | 2/2012 | Manabe |
| 9,105,107 | B2 | 8/2015 | Cha et al. |
| 2002/0001399 | A1 | 1/2002 | Yoshida et al. |
| 2004/0061802 | A1 | 4/2004 | Yoshida |
| 2006/0008176 | A1* | 1/2006 | Igari ............... G06T 3/4038 382/284 |
| 2007/0132863 | A1* | 6/2007 | Deguchi ........... G06T 3/4038 348/239 |
| 2007/0285282 | A1 | 12/2007 | Nakayama et al. |
| 2008/0074535 | A1 | 3/2008 | Ohsuga et al. |
| 2008/0122946 | A1 | 5/2008 | Sung et al. |
| 2008/0170804 | A1* | 7/2008 | Zhang .............. G06K 9/32 382/284 |
| 2009/0097745 | A1 | 4/2009 | Kim et al. |
| 2009/0231447 | A1* | 9/2009 | Paik ................. G01S 3/7864 348/208.4 |
| 2010/0110234 | A1 | 5/2010 | Kaneko et al. |
| 2010/0172585 | A1 | 7/2010 | Murashita et al. |
| 2010/0321470 | A1 | 12/2010 | Oshima |
| 2011/0128436 | A1 | 6/2011 | Ohsuga et al. |
| 2012/0026333 | A1 | 2/2012 | Okuyama |
| 2012/0263235 | A1* | 10/2012 | Sugio ............... H04N 19/513 375/240.16 |
| 2012/0274818 | A1 | 11/2012 | Matsuoka |
| 2013/0076936 | A1 | 3/2013 | Yoshida |
| 2014/0071228 | A1 | 3/2014 | Cho et al. |
| 2014/0078247 | A1 | 3/2014 | Shohara et al. |
| 2014/0118578 | A1 | 5/2014 | Sasaki et al. |
| 2015/0222816 | A1 | 8/2015 | Shohara et al. |

FOREIGN PATENT DOCUMENTS

| | | |
|---|---|---|
| JP | 2002-042109 | 2/2002 |
| JP | 2002-281379 | 9/2002 |
| JP | 2007-156792 | 6/2007 |
| JP | 2009-59119 A | 3/2009 |
| JP | 4739122 | 5/2011 |
| JP | 2011-228856 A | 11/2011 |
| JP | 5108840 | 10/2012 |
| JP | 2012-231406 A | 11/2012 |
| JP | 2013-114678 A | 6/2013 |
| JP | 2013-198070 | 9/2013 |
| JP | 2014-057156 | 3/2014 |
| JP | 2014-78926 A | 5/2014 |
| KR | 10-0781552 B1 | 12/2007 |
| KR | 10-2012-0136813 A | 12/2012 |
| KR | 10-2014-0034703 A | 3/2014 |
| KR | 10-2014-0085892 A | 7/2014 |
| WO | 2014/042104 | 3/2014 |

OTHER PUBLICATIONS

Office Action dated Jul. 27, 2017 in Korean Patent Application No. 10-2016-7032914 (with English translation).

Korean Notice of Allowance dated Mar. 19. 2018 in Korean Patent Application No. 10-2018-7032914 (with English translation), citing documents AA through AC, and AO through AR therein, 8 pages.

Combined Office Action and Search Report dated Oct. 9, 2018 in Chinese Patent Application No. 201580027228.2 coting documents AO and AP therein, 17 pages (with English translation).

International Search Report dated Aug. 18, 2015 in PCT/JP2015/065151 filed on May 20, 2015.

* cited by examiner

FIG.3
(a)
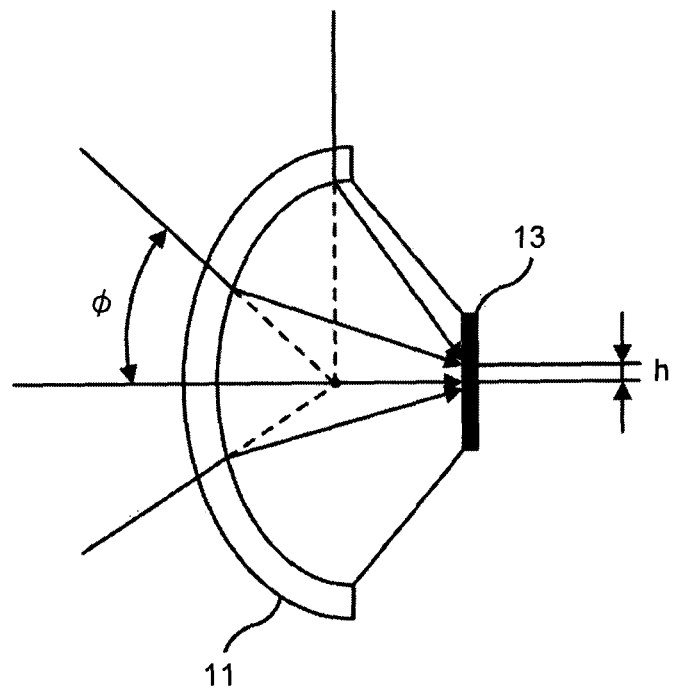
(b)
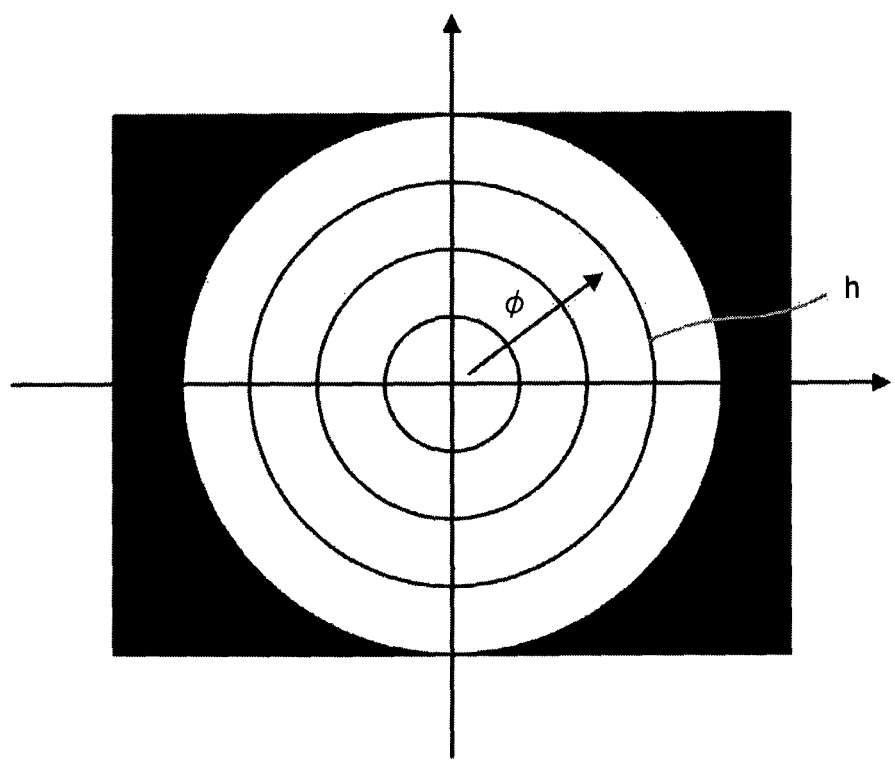

FIG.4
(a)
FIRST IMAGING ELEMENT
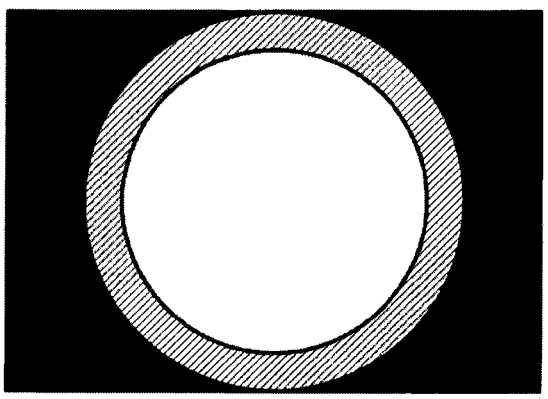
SECOND IMAGING ELEMENT
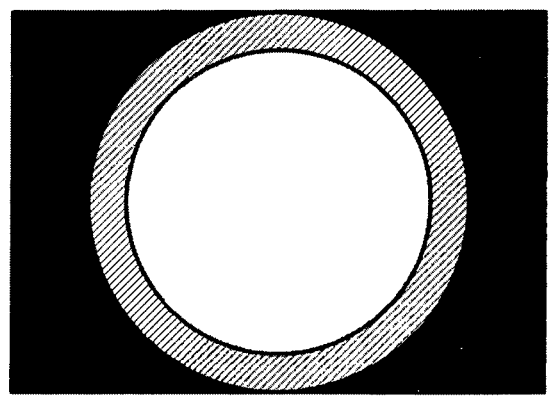
(b)
FIRST IMAGING ELEMENT
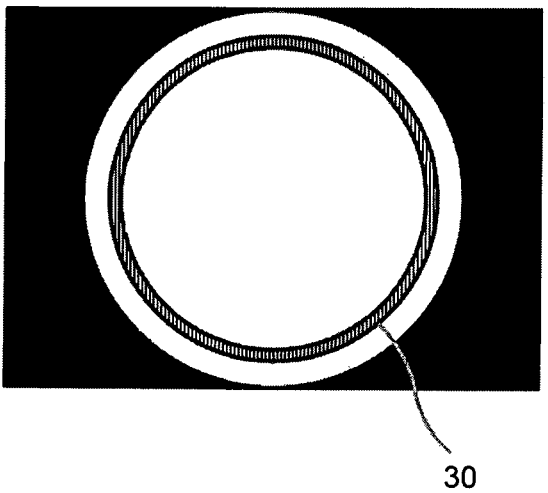
SECOND IMAGING ELEMENT
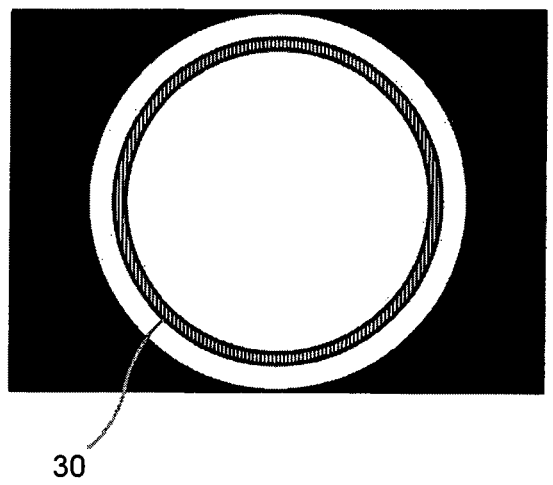

FIG.5
(a)
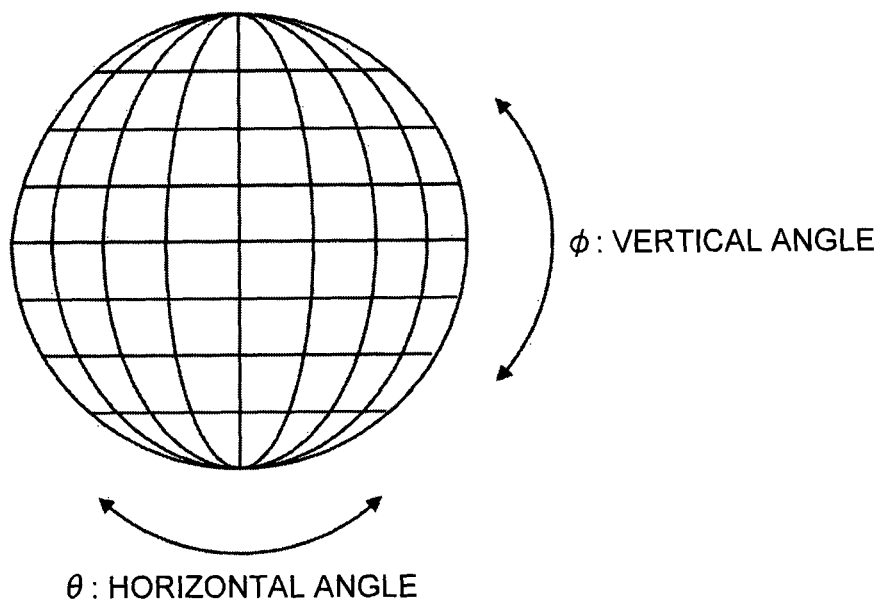
(b)
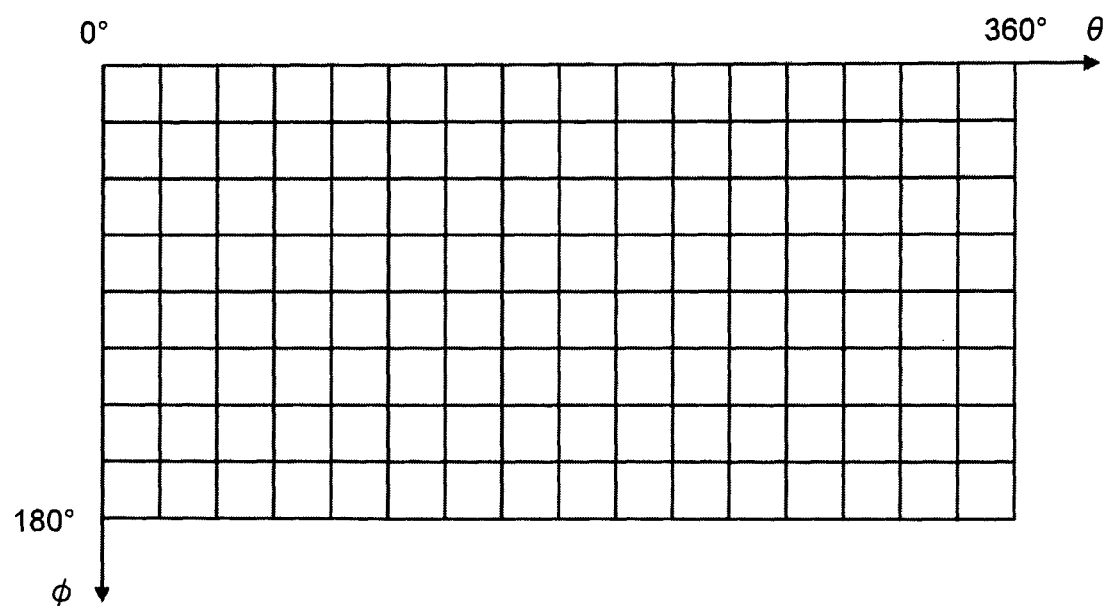

(a)

| COORDINATE VALUES OF POST-CONVERSION IMAGE | | COORDINATE VALUES OF PRE-CONVERSION IMAGE | |
|---|---|---|---|
| θ (pix) | φ (pix) | x (pix) | y (pix) |
| 0 | 0 | | |
| 1 | 0 | | |
| 2 | 0 | | |
| ⋮ | ⋮ | | |
| 3597 | 1799 | | |
| 3598 | 1799 | | |
| 3599 | 1799 | | |

(b)

FIG.8
(a)
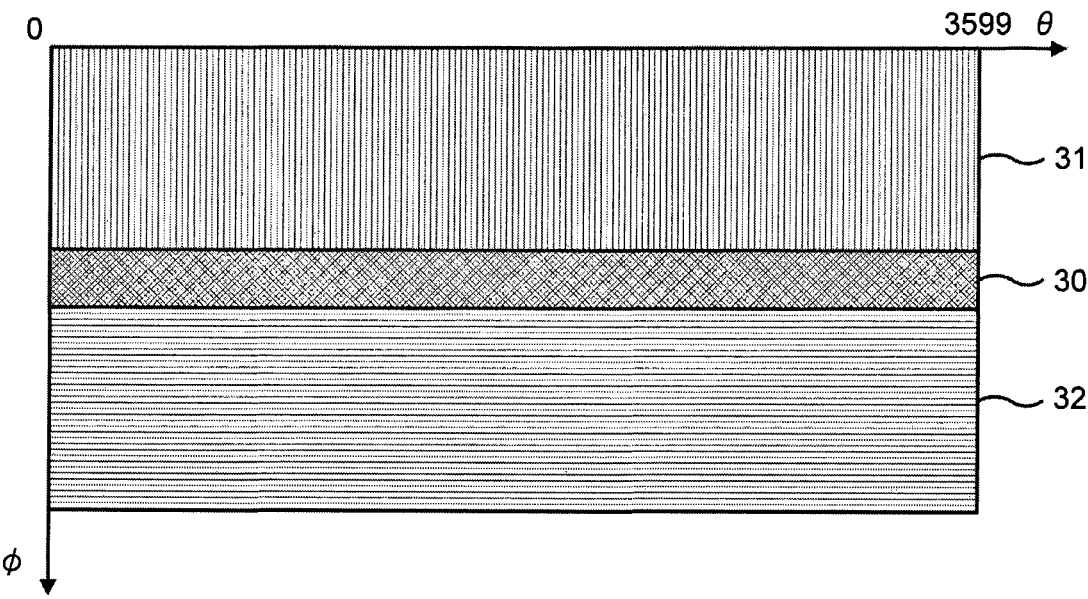
(b)
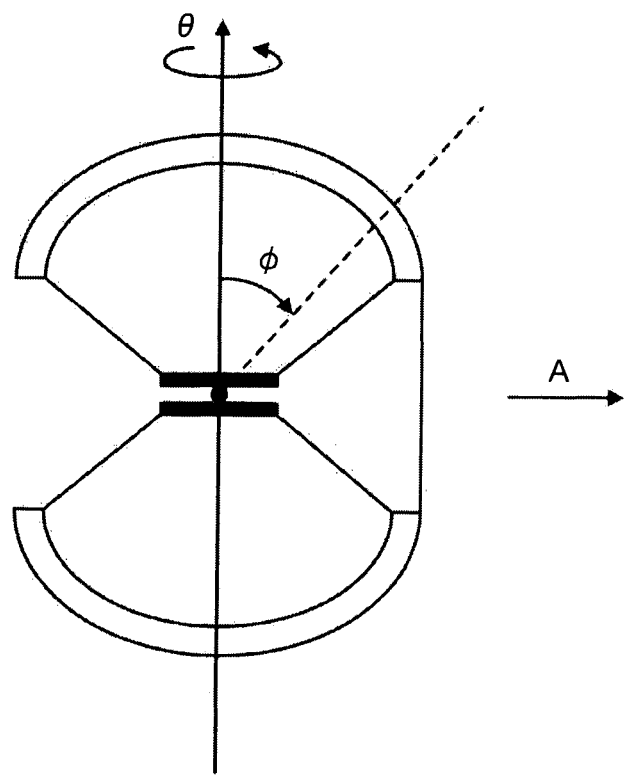

FIG.9
(a)
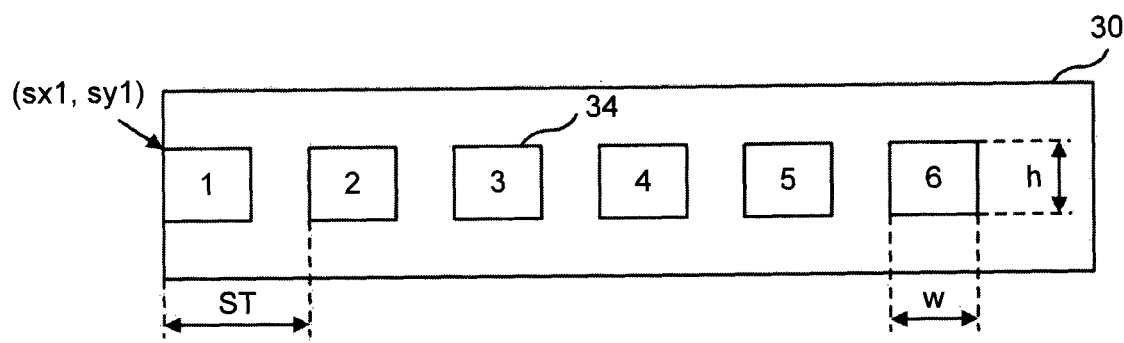
(b)
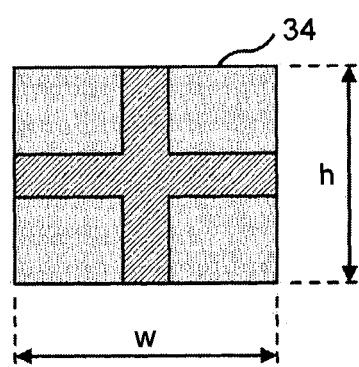
(c)
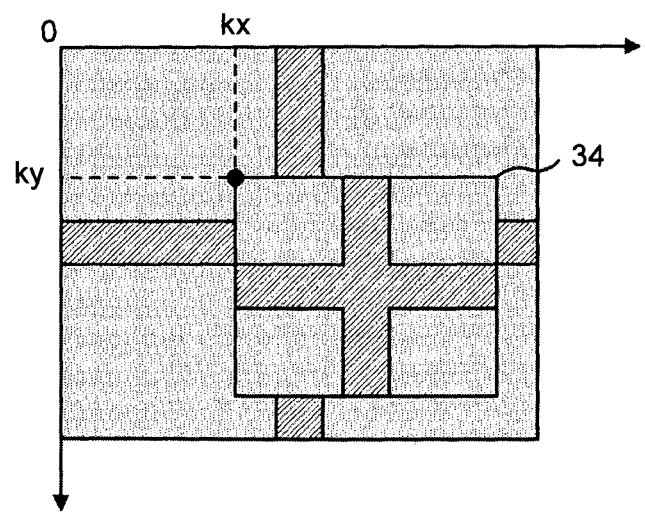

FIG.12
(a)
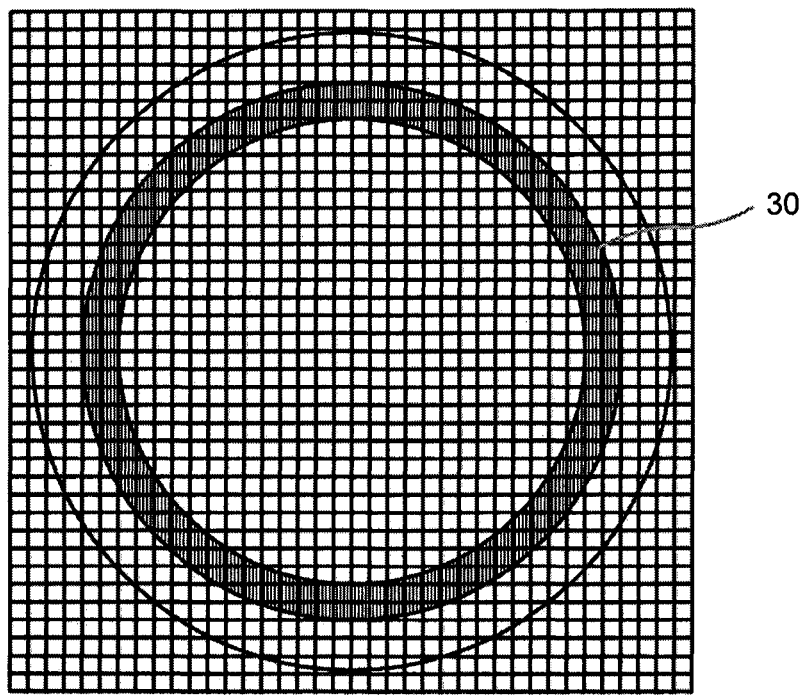
(b)
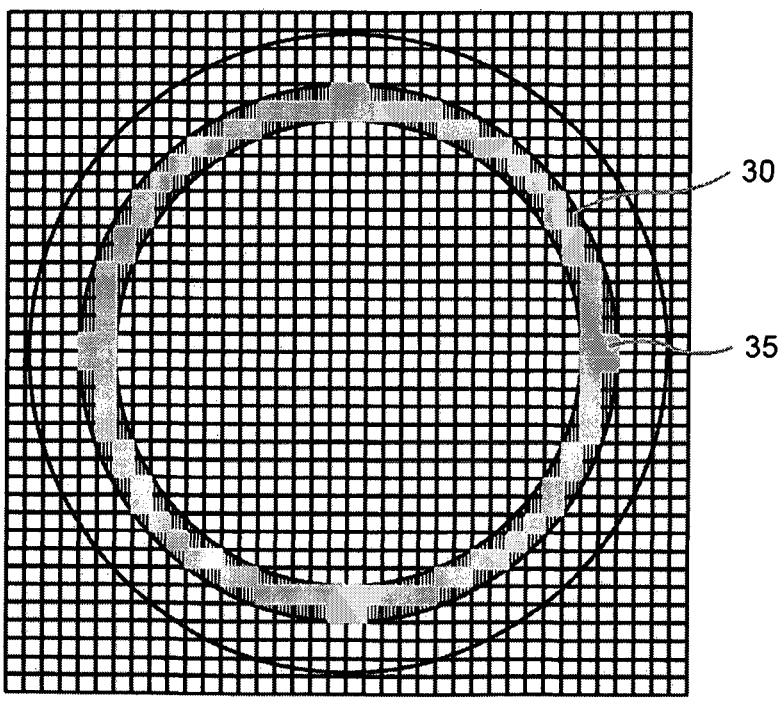

FIG.15
(a)
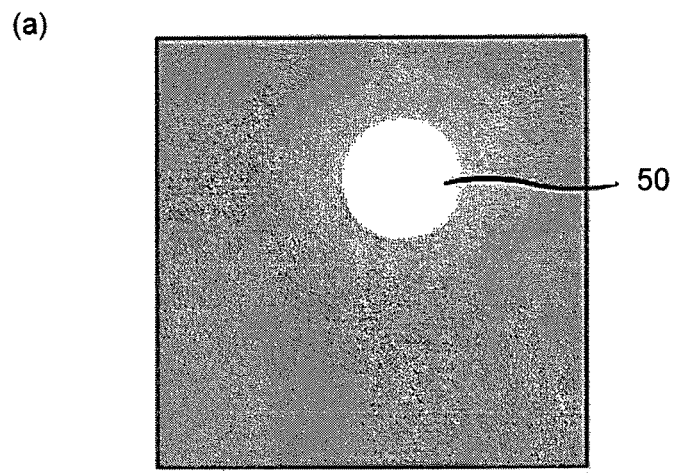
(b)
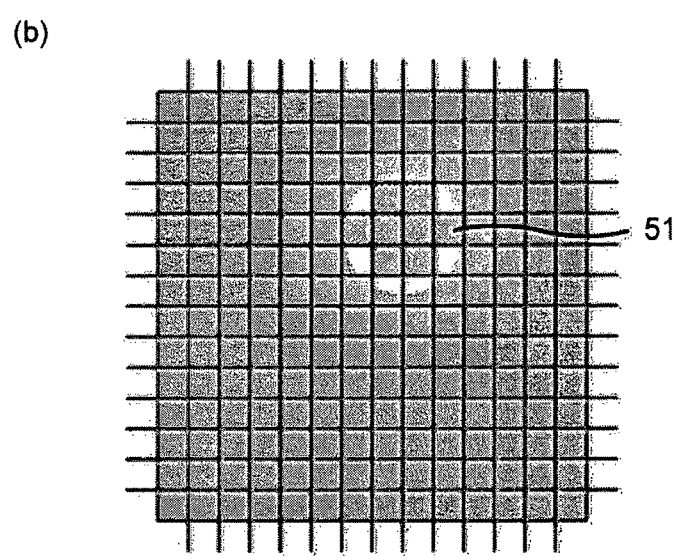
(c)
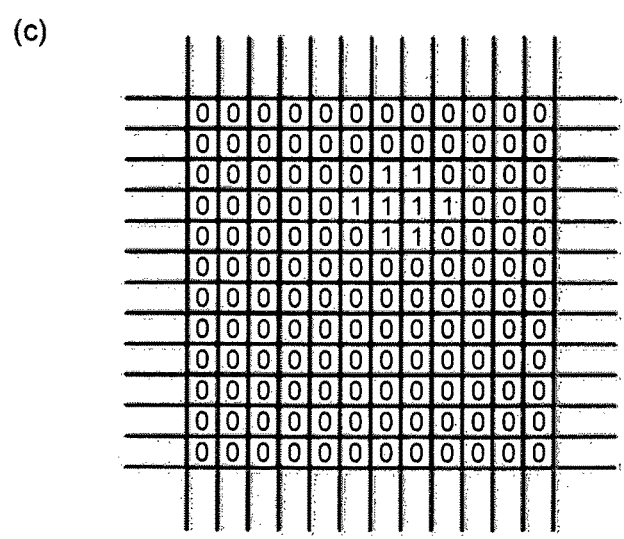

FIG.16
(a)
FLARE IMAGE        REFERENCE IMAGE
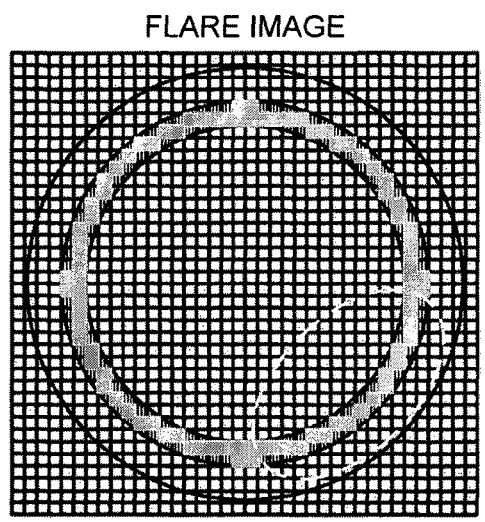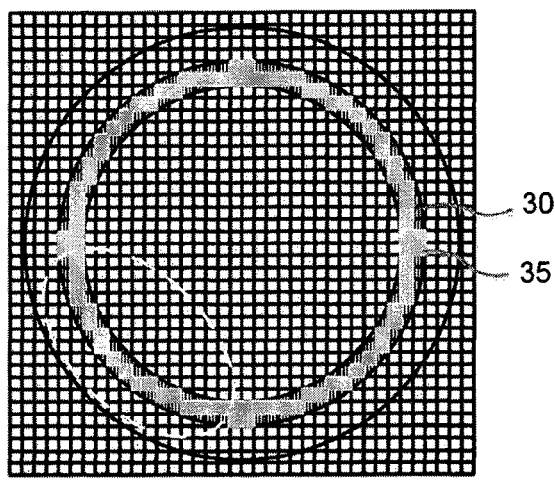
30
35
(b)
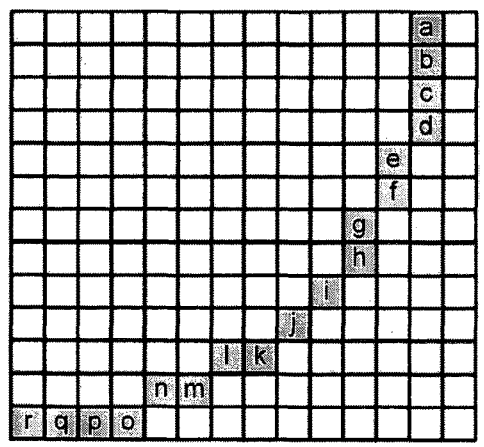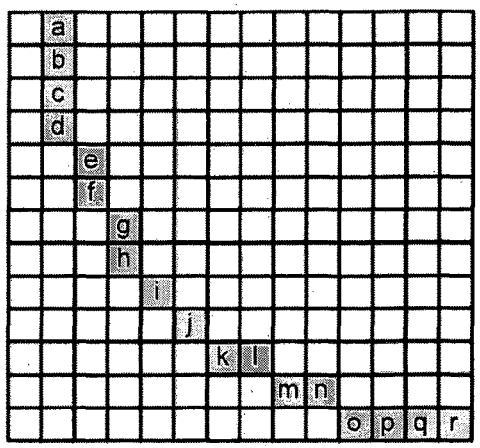

|  | x1 | x2 | x3 | x4 | x5 |
|---|---|---|---|---|---|
| y1 | 0.92 | 0.94 | 0.96 | 0.97 | 0.97 |
| y2 | 0.94 | 0.95 | 0.97 | 0.98 | 0.97 |
| y3 | 0.95 | 0.97 | 0.99 | 0.97 | 0.95 |
| y4 | 0.94 | 0.96 | 0.97 | 0.95 | 0.93 |
| y5 | 0.93 | 0.94 | 0.95 | 0.94 | 0.93 |

(b)

|  | x1 | x2 | x3 | x4 | x5 |
|---|---|---|---|---|---|
| y1 | 0 | 0 | 0 | 0 | 0 |
| y2 | 0 | 0 | 1 | 1 | 0 |
| y3 | 0 | 0 | 1 | 0 | 0 |
| y4 | 0 | 0 | 0 | 0 | 0 |
| y5 | 0 | 0 | 0 | 0 | 0 |

(c)

|  | x1 | x2 | x3 | x4 | x5 |
|---|---|---|---|---|---|
| y1 | 0.92 | 0.94 | 0.96 | 0.97 | 0.97 |
| y2 | 0.94 | 0.95 | 1.00 | 1.00 | 0.97 |
| y3 | 0.95 | 0.97 | 1.00 | 0.97 | 0.95 |
| y4 | 0.94 | 0.96 | 0.97 | 0.95 | 0.93 |
| y5 | 0.93 | 0.94 | 0.95 | 0.94 | 0.93 |

FIG.22
(a)
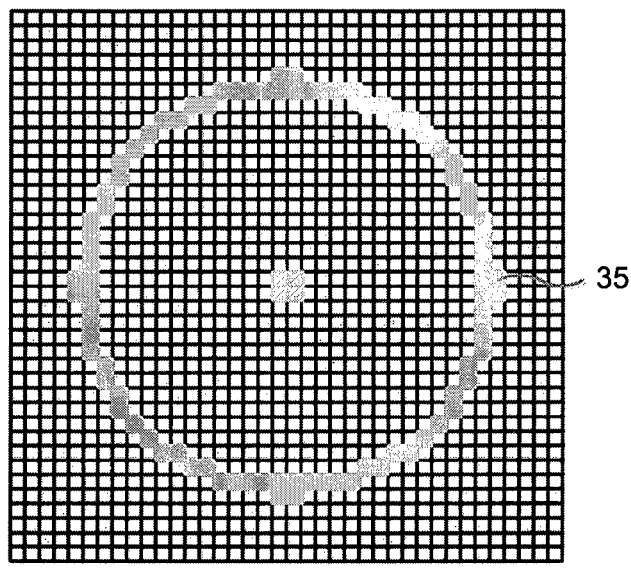
(b)
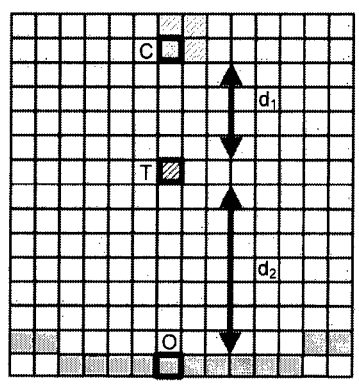
(c)
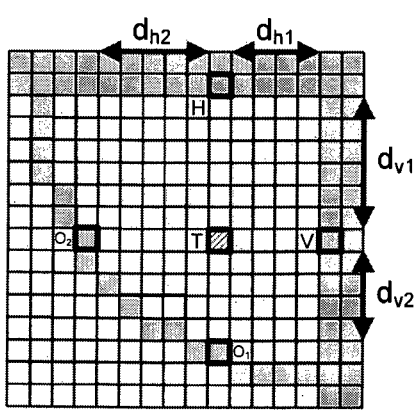

FIG. 23
(a)
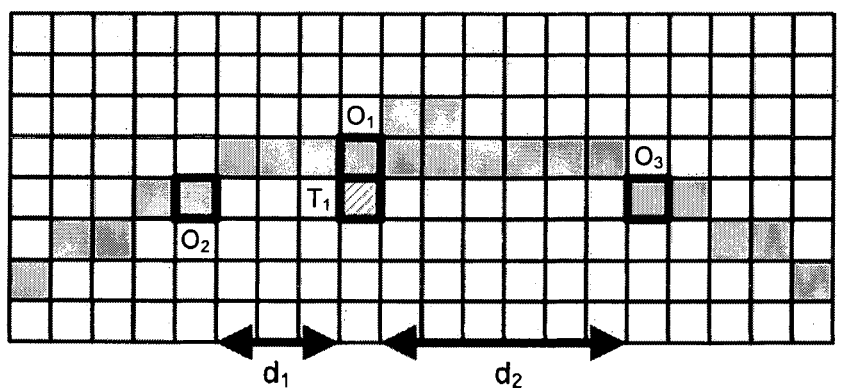
(b)
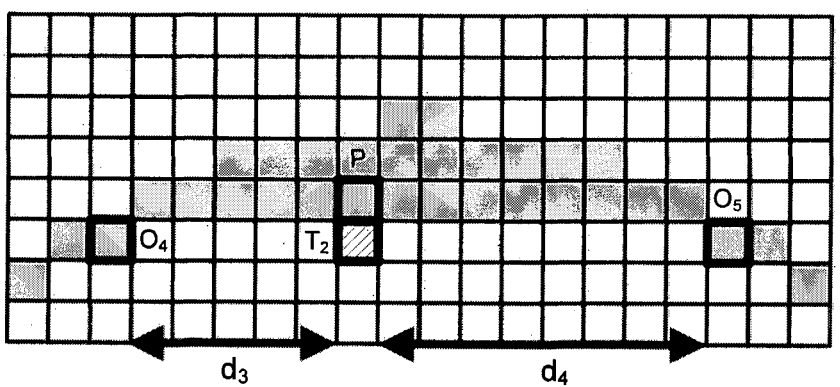

FIG.28
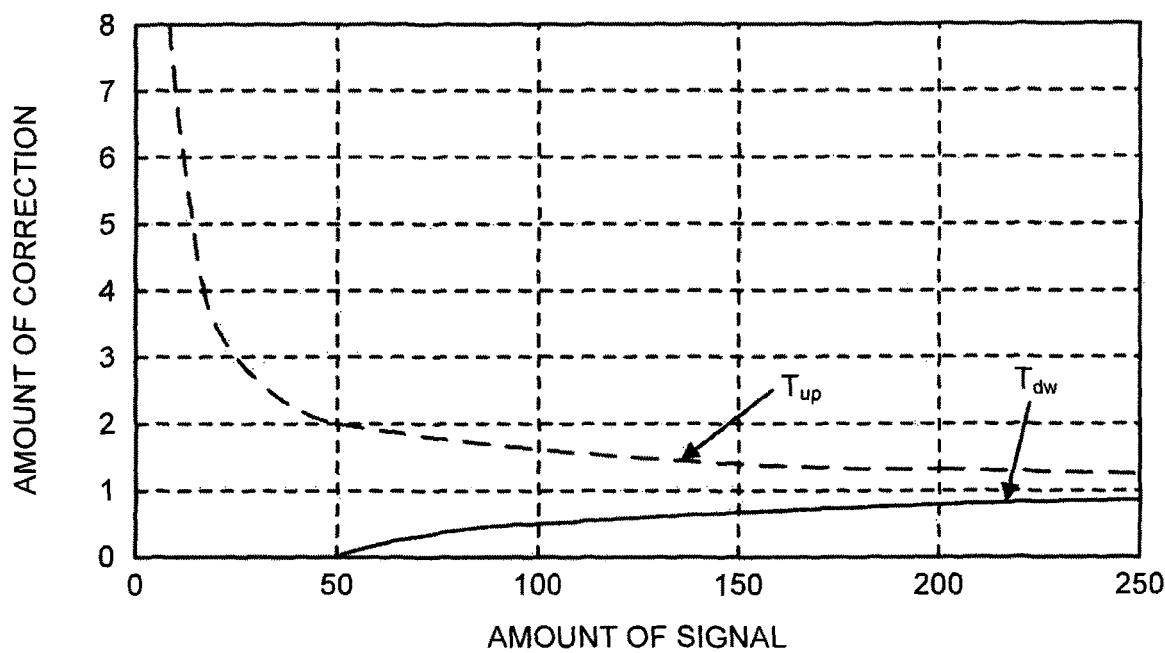
(a)
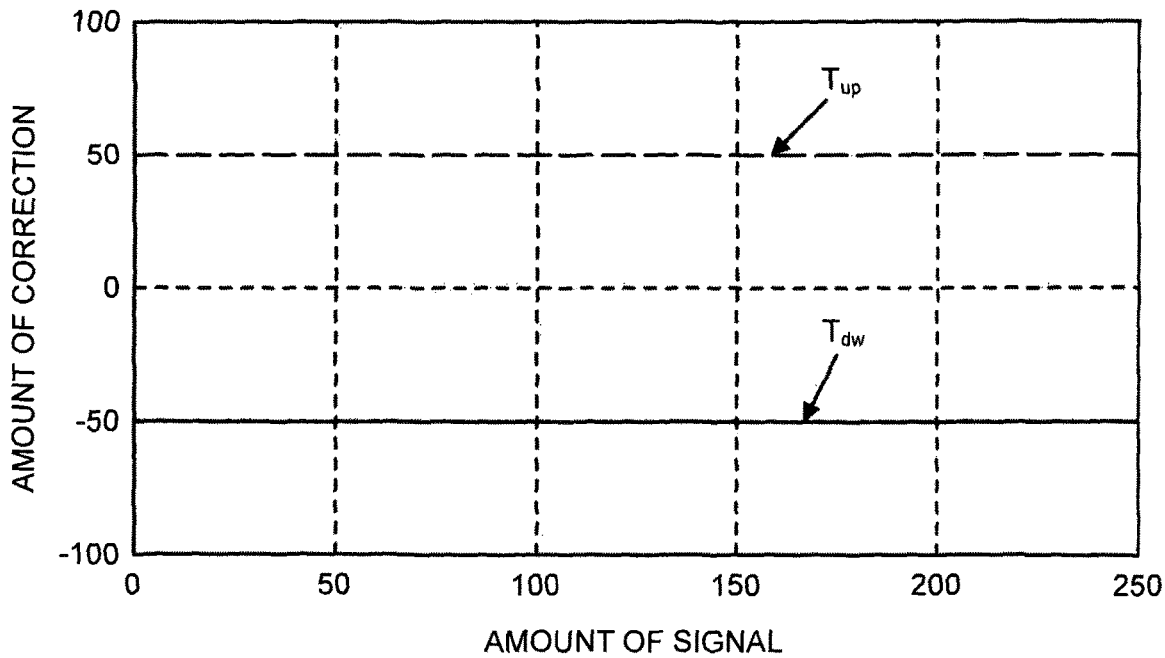
(b)

IMAGE PROCESSING SYSTEM, IMAGING APPARATUS, IMAGE PROCESSING METHOD, AND COMPUTER-READABLE STORAGE MEDIUM

TECHNICAL FIELD

The present invention relates to an image processing system, an imaging apparatus, an image processing method, and a computer-readable storage medium for causing a computer to execute the method.

BACKGROUND ART

As an imaging apparatus capable of 360° imaging, there is known an omnidirectional imaging camera used as a monitoring camera. The omnidirectional imaging camera uses a plurality of wide-angle lenses or fish-eye lenses to take images by a plurality of imaging elements, makes distortion correction and projective transform on a plurality of taken images, and combines them to produce one omnidirectional image. Images taken by adjacent imaging elements have image overlapping regions in which the images partly overlap each other. The omnidirectional imaging camera combines the images by the image overlapping regions.

The omnidirectional imaging camera takes images by using the plurality of imaging elements different in imaging direction, and the image overlapping regions of the images obtained by the imaging elements differ in brightness and color, which causes a problem of deterioration in visibility of the combined image. There has been suggested a technique for reducing differences in color tone between the image overlapping regions by correcting the image overlapping regions with the use of an initial gain for making uniform the color tones of the image overlapping regions and a correction gain for reducing differences from the other imaging elements (for example, refer to Japanese Patent No. 4739122).

The omnidirectional imaging camera takes images in a wide area using the wide-angle lenses and fish-eye lenses, and thus light from a light source such as the sun or an illumination device is likely to enter the imaging range. In this case, it is known that there is a high possibility that a flare occurs so that the images is whitely blurred and appears to have spreading of light. The flare does not occur evenly on the images, and thus the image with a flare and the image with no flare differ from each other in brightness and color. Therefore, there is a problem that a seam in the combined image is prominent.

According to the foregoing conventional technique, the differences in color tone between the image overlapping regions can be reduced to make the seam less prominent, but the other image regions cannot be corrected. As a result, the combined image has differences in brightness and color.

Therefore, there is a need to provide systems and methods allowing reduction differences in brightness and color between a plurality of images.

SUMMARY OF THE INVENTION

It is an object of the present invention to at least partially solve the problems in the conventional technology.

According to an embodiment, there is provided an image processing system for performing image processing on a plurality of images including overlapping image regions as overlapping regions. The image processing system includes: a calculator configured to calculate an evaluation value for evaluating each of the plurality of images using pixel values of one or more pixels in each of the overlapping regions; a determination controller configured to determine, based on the evaluation values calculated by the calculator, whether there is an image to be corrected in the plurality of images; an image determiner configured to, when the determination controller determines that there is the image to be corrected, determine a correction reference image as a reference for correction, out of the plurality of images, based on the evaluation values; and an image corrector configured to correct the image to be corrected based on the correction reference image determined by the image determiner.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

FIG. 3 is a diagram describing a fish-eye lens for use in the imaging apparatus.

FIG. 4 is a diagram describing overlapping regions in a plurality of images taken by the imaging apparatus.

FIG. 5 is a diagram describing a format of an omnidirectional image.

FIG. 8 is a diagram illustrating the result of distortion correction.

FIG. 9 is a diagram describing a method for detecting a connecting position.

FIG. 12 is a diagram describing acquisition of evaluation values at step S1110 described in FIG. 11.

FIG. 15 is a diagram describing creation of a correction exclusion map.

FIG. 16 is a diagram describing a method for calculating the amounts of correction to an overlapping region.

FIG. 18 is a diagram describing a method for modifying the correction map created with reference to FIG. 14 by the correction exclusion map created with reference to FIG. 15.

FIG. 22 is a diagram describing interpolation between the amounts of correction at step S1430 described in FIG. 14.

FIG. 23 is a diagram describing interpolation between the amounts of correction at step S1430 described in FIG. 14.

FIG. 28 is a diagram illustrating an example of a threshold table for use in the process described in FIG. 27.

DESCRIPTION OF EMBODIMENTS

Figure 1:
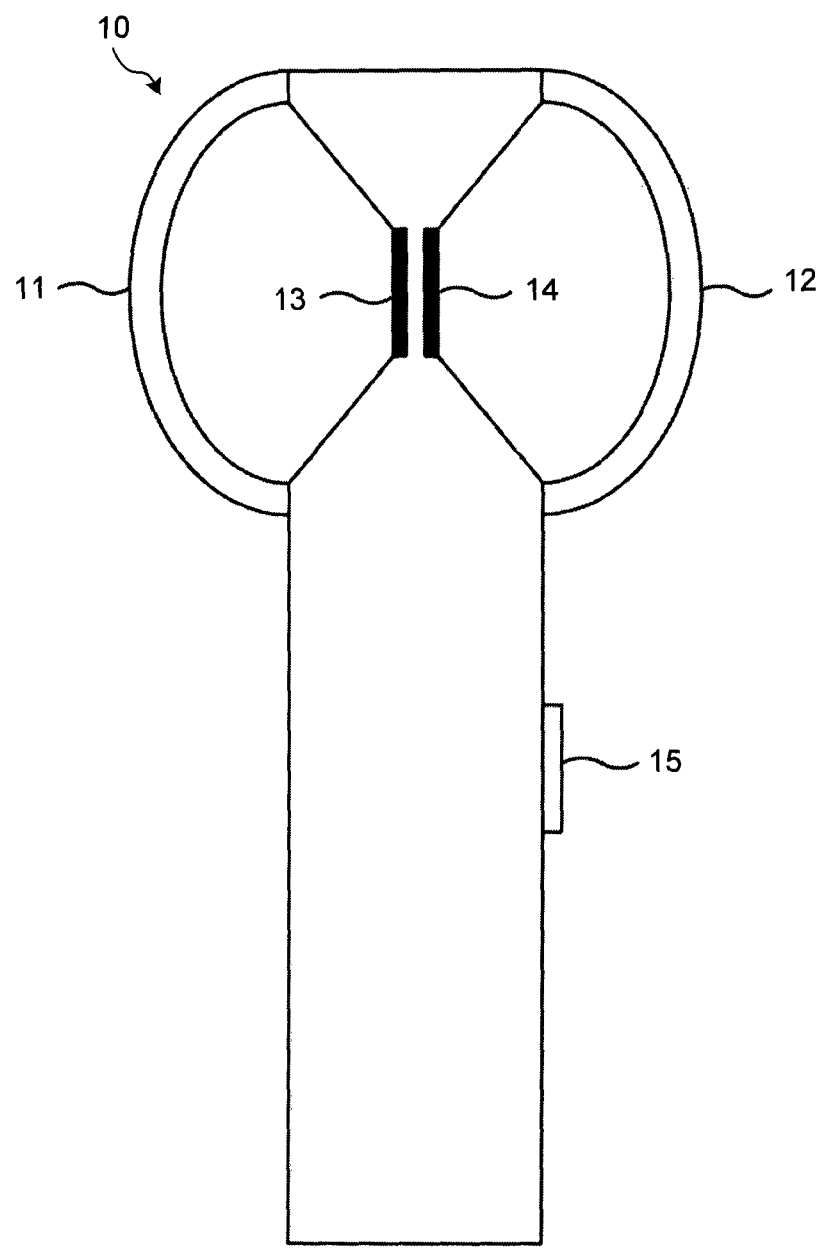
FIG. 1 is an external view of an imaging apparatus.

FIG. 1 is an external view of an imaging apparatus including an image processing system. In this example, the imaging apparatus is an omnidirectional imaging camera but is not limited to this. The imaging apparatus may be any imaging device configured to take overlapping image regions (overlapping regions) by a plurality of imaging elements and connect the plurality of taken images by their overlapping regions. The process for connecting the plurality of taken images by their overlapping regions can be performed by the use of an image processing IC or software.

An omnidirectional imaging camera 10 includes two fish-eye lenses 11 and 12 having an viewing angle of more than 180° and two imaging elements 13 and 14 corresponding to the fish-eye lenses 11 and 12, respectively, for omnidirectional imaging at one imaging position. In this example, the omnidirectional imaging camera 10 is configured to include the two fish-eye lenses 11, 12 and the two imaging elements 13, 14. However, the omnidirectional imaging camera 10 is not limited to this configuration but may include three or more each components. The viewing angle refers to an angular range of imaging by the fish-eye lenses 11 and 12.

The fish-eye lenses 11 and 12 may be an equidistant projection type in which the distance from the center of a taken image is proportional to the incidence angle of light. The imaging elements 13 and 14 may be charge coupled device (CCD) image sensors or complementary metal oxide semiconductor (CMOS) image sensors that convert incident light into an electric signal. The two imaging elements 13 and 14 take images omnidirectionally so that the taken images include overlapping regions as overlapping image regions.

The imaging is performed by a photographer pressing an imaging SW 15 to cause the imaging elements 13 and 14 to make exposures at the same time. The imaging elements 13 and 14 convert received light into electric signals to acquire images. The acquired images are taken by the use of the fish-eye lenses 11 and 12 and thus are referred to as fish-eye images. The two fish-eye images acquired by the two imaging elements 13 and 14 are subjected to image conversion and are combined by the overlapping regions in subsequent image processing, thereby to produce an omnidirectional image.

The omnidirectional imaging camera 10 may store data for the produced omnidirectional image and, upon receipt of a request, output the data to equipment including a display device such as a PC not illustrated to display the omnidirectional image on the display device. The omnidirectional imaging camera 10 may also output the produced omnidirectional image to a printer or a multi-function peripheral (MFP) not illustrated for production of a print output. The omnidirectional imaging camera 10 may further output the produced omnidirectional image to an MFP or a PC for facsimile transmission or mail transmission.

Figure 2:
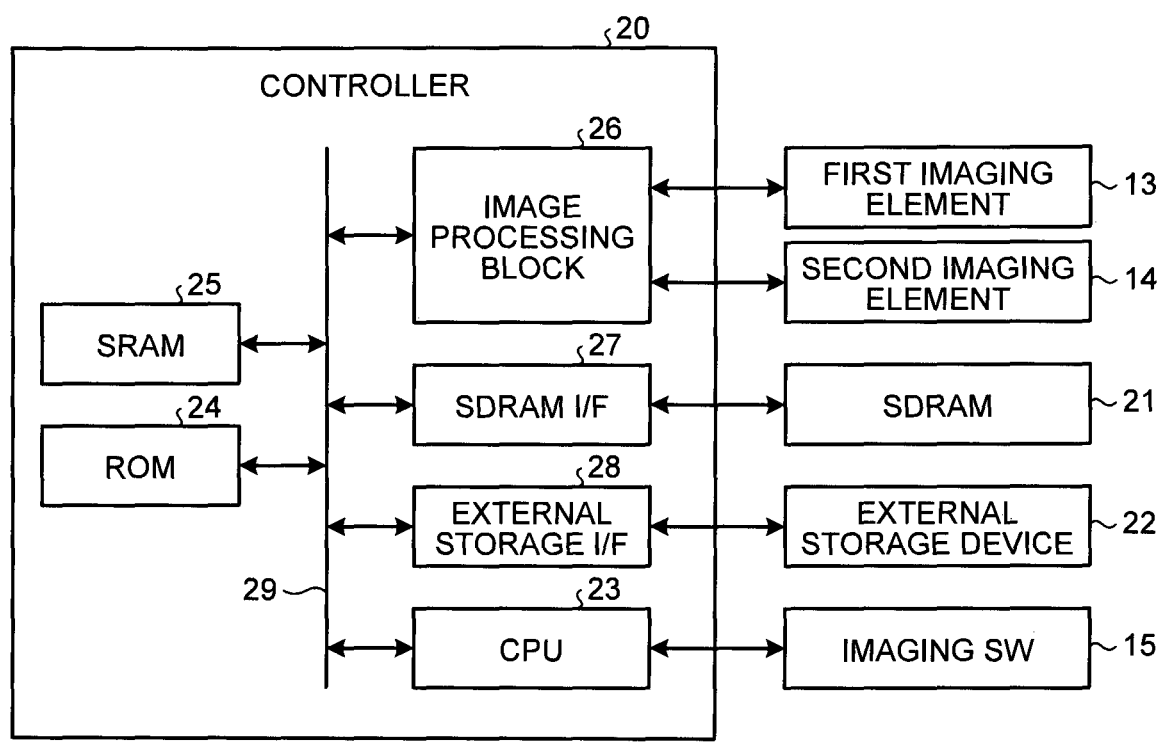
FIG. 2 is a diagram illustrating a hardware configuration of the imaging apparatus.

FIG. 2 is a diagram illustrating a hardware configuration of the omnidirectional imaging camera 10. In the example of FIG. 2, the fish-eye lenses 11 and 12 are not illustrated. The omnidirectional imaging camera 10 includes a controller 20, an SDRAM 21, and an external storage device 22 as well as the two imaging elements 13 and 14 and the imaging SW 15. The SDRAM 21 is used in combination with the controller 20 to store programs for realizing predetermined image processing. The external storage device 22 stores image-processed data, that is, the foregoing omnidirectional image data.

The controller 20 includes a CPU 23, a ROM 24, a SRAM 25, an image processing block 26, an SDRAM I/F 27, and an external storage I/F 28, which are each connected to a bus 29. The CPU 23 controls the entire omnidirectional imaging camera 10. The ROM 24 stores a program for activating the omnidirectional imaging camera 10, a conversion table described later, and others. The SRAM 25 provides a working area for the CPU 23. The image processing block 26 performs the foregoing predetermined image processing in conjunction with the CPU 23, the SRAM 25, and the SDRAM 21, and the like. The image processing block 26 may be an application specific integrated circuit (ASIC) as a special-purpose integrated circuit.

The omnidirectional imaging camera 10 acquires two fish-eye images by the two imaging elements 13 and 14. The imaging elements 13 and 14 each include an A/D converter, and convert the converted electric signals into digital data by the A/D converters. The imaging elements 13 and 14 output the digital data as fish-eye image data to the image processing block 26 included in the controller 20. The image processing block 26 performs the foregoing image conversion and a process for connecting the images into an omnidirectional image in conjunction with the CPU 23 and the like as the predetermined image processing, and stores the produced omnidirectional image data into the external storage device 22 via the external storage I/F 28.

The omnidirectional imaging camera 10 further includes a communication I/F to perform wired or wireless communications with PCs, MFPs, and others not illustrated to transmit the omnidirectional image data to these devices for screen display, print output, or the like. The wireless communications may be performed through wireless LANs such as Wi-Fi, Bluetooth (registered trademark), and infrared rays.

Referring to FIG. 3, the fish-eye lens 11 will be described in detail. The fish-eye lens 12 is configured in the same manner as the fish-eye lens 11, and only descriptions of the fish-eye lens 11 will be given here. The fish-eye image taken by the imaging element 13 having the fish-eye lens 11 with a viewing angle of more than 180° is an approximately semispherical image of a subject centered on the imaging position.

As illustrated in (a) in FIG. 3, when the incidence angle of light on the fish-eye lens 11 is designated as $\phi$, the distance between the center and image point of the image is given as an image height h, and a projective function is designated as f, the relationship between these items can be expressed by the following Equation (1).

$$h = f(\phi) \tag{1}$$

The projective function f varies depending on the properties of the fish-eye lens 11. For example, when an equidistant projection-type fish-eye lens is used, the proportional relationship exists as illustrated in (b) in FIG. 3 such that, as the incidence angle φ becomes larger as shown by an arrow, the image height h becomes larger. In (b) in FIG. 3, the blackened region on the outside of the circle is a region with no light incidence.

Referring to FIG. 4, overlapping regions in the two fish-eye images taken by the imaging elements 13 and 14 will be described. In FIG. 4, the imaging element 13 is referred to as "first imaging element", and the imaging element 14 as "second imaging element". The fish-eye lenses 11 and 12 each have a viewing angle of more than 180°, and the fish-eye images taken by the imaging elements 13 and 14 include overlapping regions. In FIG. 4, (a) illustrates the fish-eye images taken by the imaging elements 13 and 14 that include blackened regions with no light incidence, white regions with an incidence angle of 90° or less, and diagonally shaded regions with an incidence angle of more than 90°.

The diagonally shaded regions in (a) in FIG. 4 are image regions overlapping between the two fish-eye images, which can be defined as overlapping regions. However, the fish-eye lenses 11 and 12 are likely to cause larger distortion and aberration as the image height h becomes larger to make the image point more distant from the center of the image. In addition, the outer frames of the fish-eye lenses 11 and 12 may be reflected in the images. No images of regions with distortion or aberration or images of the outer frames can be used for image connection.

Accordingly, as illustrated in (b) in FIG. 4, the overlapping regions 30 may be limited to ring-shaped inside regions with a predetermined width shown by vertical stripes. In the example of (b) in FIG. 4, the two fish-eye images are obtained through simultaneous exposure by the imaging elements 13 and 14, and thus the overlapping regions 30 basically constitute images of the same subject.

Next, referring to FIG. 5, an omnidirectional image will be described. Each of the fish-eye images is formatted to represent an approximately semispherical image in a circular form as illustrated in (a) in FIG. 5. Taking a terrestrial globe as an example, longitudes correspond to horizontal angles and latitudes to vertical angles. The horizontal angles fall within a range of 0 to 360° and the vertical angles fall within a range of 0 to 180°.

The omnidirectional image is formatted in a rectangular form illustrated in (b) in FIG. 5, which is produced by combining two semispherical images with horizontal angles along the horizontal direction and vertical angles along the vertical direction. In a precise sense, each of the images to be combined is larger by the overlapping region than a semispherical image, but is referred here as to a semispherical image for the sake of convenience.

The two semispherical images are produced as images having pixels corresponding to the horizontal angles and the vertical angles represented in the rectangular format of (b) in FIG. 5 with the same pixel values as those of pixels corresponding to the horizontal angles and the vertical angles in the fish-eye images. Each of the semispherical images can be produced by subjecting a fish-eye image to projective conversion. Combining two produced semispherical images can produce a full 360° omnidirectional image in the horizontal direction and the vertical direction.

Figure 6:
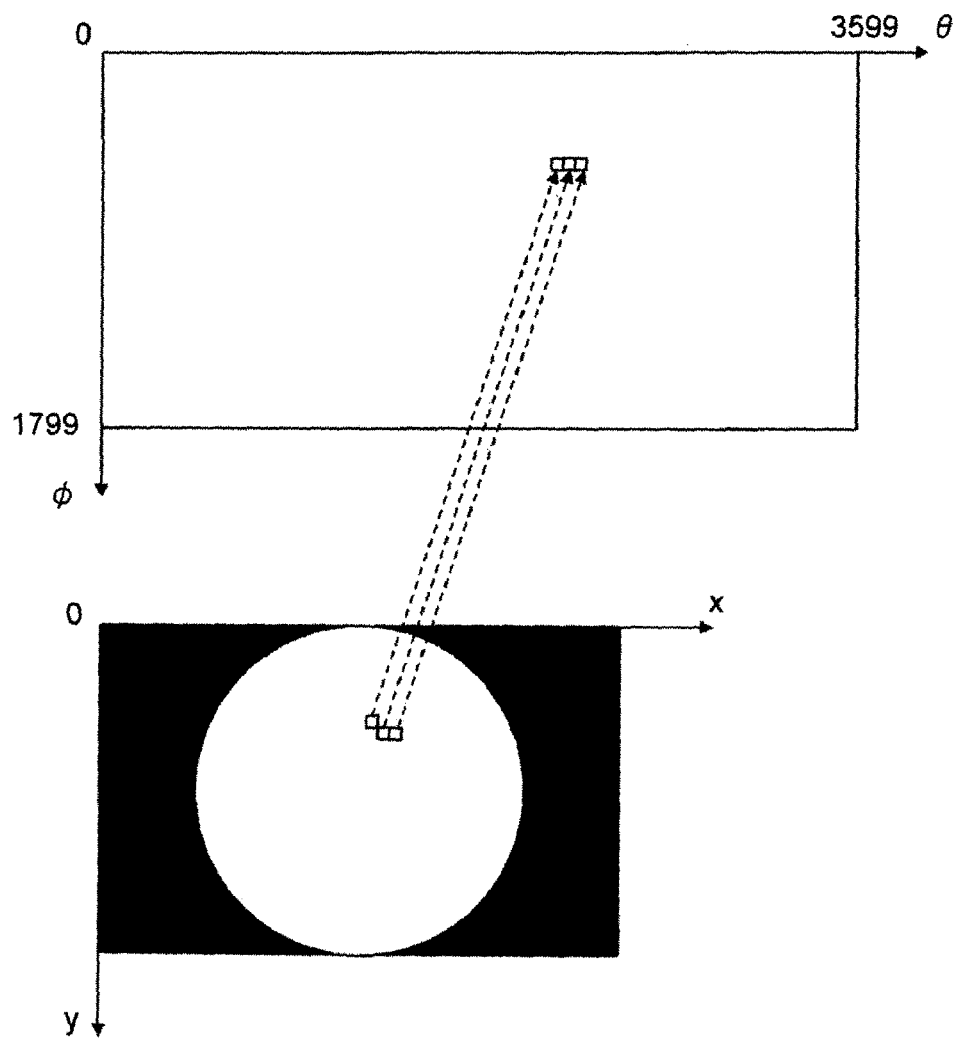
FIG. 6 is a diagram describing a conversion table for conversion of a fish-eye image to an omnidirectional image.

FIG. 6 shows an example of a conversion table for use in projective conversion of a fish-eye image. As illustrated in (a) in FIG. 6, the conversion table includes correspondences between coordinate values as values of horizontal and vertical angles of a fish-eye image as a pre-change image and coordinate values of a semispherical image as a post-change image. The coordinate values of the pre-change image are represented as (x, y), and the coordinate values of the post-change image as (θ, φ). As illustrated in (b) in FIG. 6, for each of the images, the pixels in the pre-change image and the corresponding pixels in the post-change image are determined with reference to the coordinates (0, 0) at the upper left corner, and the sets of the coordinate values of the pixels are held as data in the conversion table. The correspondences can be determined from the projective relationship between the pre-change image and the post-change image.

The conversion table can be created in advance based on lens design data and the like for each of the two fish-eye lenses 11, 12 and two imaging elements 13, 14, and can be stored in the ROM 24 illustrated in FIG. 2 and read as necessary for later use. Using the conversion tables makes it possible to subject fish-eye images to projective conversion and correct distortion in the fish-eye images. The corrected images can be combined to produce an omnidirectional image.

Figure 7:
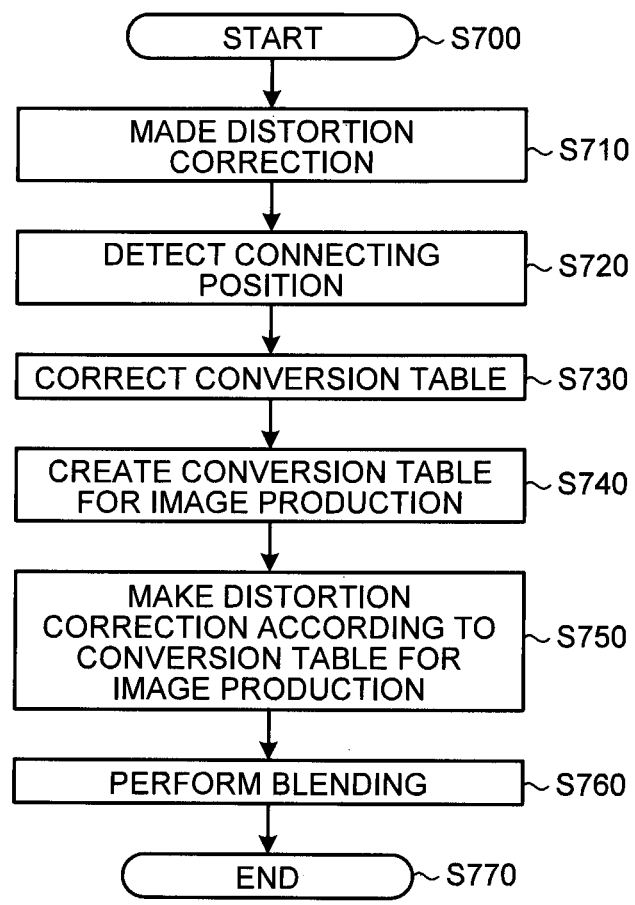
FIG. 7 is a flowchart of a process for producing an omnidirectional image.

Referring to FIG. 7, a flow of a process for producing an omnidirectional image will be described. This process is started at step S700 where two fish-eye images are taken and input by the two imaging elements 13 and 14. At step S710, the conversion table stored in the ROM 24 as illustrated in (a) in FIG. 6 is used to subject the fish-eye images to projective conversion for distortion correction. The distortion correction makes it possible to produce two semispherical images as illustrated in (a) in FIG. 5.

At step S720, a connecting position for connection of the two obtained semispherical images in the overlapping region is detected. The detection of the connecting position will be described later in detail. At step S730, the conversion table used at step S710 is corrected based on the detection result. The purpose of the correction and the specific contents of the process will be described later. At step S740, the corrected conversion table is subjected to rotation transform to create a conversion table for image production. The rotation transform is performed for the purpose of ensuring agreement between the vertical direction of the images and the zenith direction of the omnidirectional imaging camera 10 in the conversion table for image production.

At step S750, the two fish-eye images are subjected to projective conversion using the conversion table for image production to correct distortion in the images. At step S760, blending is performed to combine the two images with distortion corrected. The two images are combined by their overlapping regions. However, if there is data only for the overlapping region in one image, the combination of the images is performed using the data. After completion of the blending, the process moves to step S770 and terminated.

Referring to FIG. 8, the distortion correction at step S710 in FIG. 7 will be described in detail. The two fish-eye images taken by the two imaging elements 13 and 14 are subjected to projective conversion using their respective conversion tables to correct distortion, whereby the fish-eye images are converted into rectangular semispherical images as illustrated in (a) in FIG. 8. An image 31 taken by the imaging element 13 and converted constitutes the upper image in (a) in FIG. 8, and an image 32 taken by the imaging element 14 and converted constitutes the lower image in (a) in FIG. 8. The central image regions overlapping between the upper image and the lower image constitutes overlapping regions 30. The overlapping regions 30 can be easily detected.

In the thus converted images, the vertical direction is approximately 90° rotated relative to the vertical direction shown by an arrow A of the omnidirectional imaging camera 10 including the imaging elements 13 and 14 with the fish-eye lenses 11 and 12 illustrated in (b) in FIG. 8.

Referring to FIG. 9, a process for detecting the connecting position will be described. The detection of the connecting position can be carried out by generally known template matching. In the template matching, the overlapping regions are detected as illustrated in FIG. 8, and images with a predetermined size is taken out of the overlapping region 30 in one of the two semispherical images and is set as a template image 34 as illustrated in (a) in FIG. 9. A plurality of template images 34 are taken with a horizontal dimension w by a vertical dimension h, at predetermined regular intervals ST. Referring to (a) in FIG. 9, the template images 34 are rectangular images with numbers 1 to 6. Each of the template images 34 has coordinates at its upper left corner as takeout coordinates (sx1, sy1) for the template image 34. Each of the taken template images 34 is an image illustrated in (b) in FIG. 9, for example.

The connecting position is detected such that coordinates (kx, ky) are set at the upper left corner of the template image 34 as a searching position, the searching position is shifted within the overlapping region of the other of the two semispherical images to search for the position with the highest evaluation value, as illustrated in (c) in FIG. 9. The range of the search may fall within the overlapping region. Then, the difference between the coordinates (kx, ky) detected by template matching and the takeout coordinates (sx1, sy1) for the template image 34 is output as detection result of the connecting position. The detection result is obtained by taking out the plurality of, template images stepwise at the predetermined intervals ST, and thus constitutes discrete data. Therefore, linear interpolation or the like may be performed to acquire data between the discrete data.

The overlapping regions represent images of the same subject but have disparity therebetween because the imaging elements 13 and 14 are oriented in different directions relative to the subject. Upon the occurrence of disparity, the subject is represented in a double image, which requires the two images to be adjusted to either one of them. The detection of the combining position is intended to correct such disparity. The disparity varies depending on the position of the subject and the optimum connecting position needs to be detected in each of overlapping regions at each imaging.

The correction of the conversion table at step S730 described in FIG. 7 is made with the use of the coordinates detected by template matching. Specifically, the difference as detection result of the connecting position is added to the coordinate values (x, y) in the conversion table for use in one fish-eye image to correct the coordinate values. The correction is intended to connect the one fish-eye image to the other fish-eye image. Accordingly, no correction is made to the conversion table for use in the other fish-eye image.

The foregoing descriptions are given as to the process for subjecting the fish-eye images taken by the two imaging elements 13 and 14 to image conversion and connecting the two images to produce an omnidirectional image. Hereinafter, descriptions will be given as to a process for determining whether a flare has occurred in the fish-eye images and, when a flare has occurred, correcting appropriately to reduce differences in brightness and color resulting from the occurrence of the flare. In the following descriptions, the flare is taken as an example of a cause of differences in brightness and color. However, the cause of an unnaturally combined image with differences in brightness and color is not limited to the flare.

Figure 10:
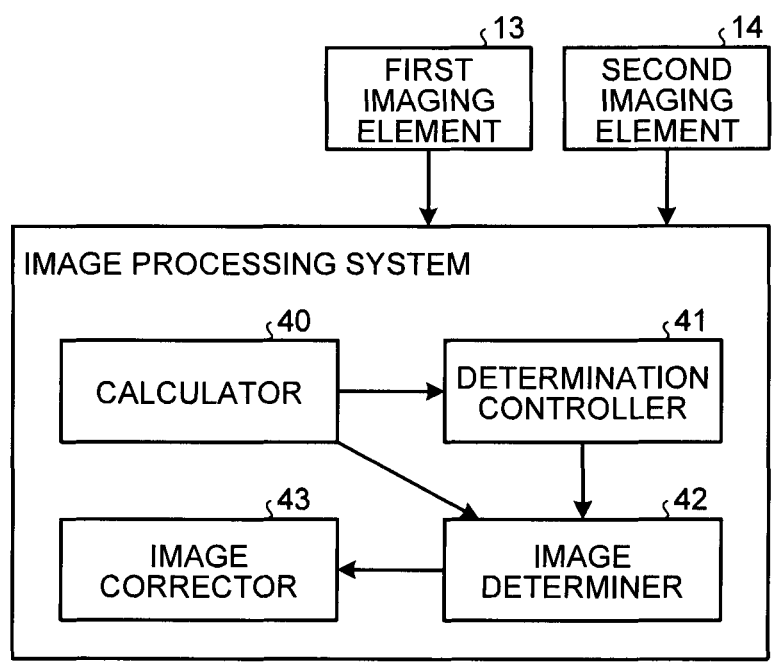
FIG. 10 is a functional block diagram of an image processing system.

FIG. 10 is a functional block diagram of an image processing system for realizing the foregoing process. The image processing system is configured to perform image processing on a plurality of images input from the plurality of imaging elements 13 and 14 and others. The image processing system is configured to include a calculator 40, a determination controller 41, an image determiner 42, and an image corrector 43. These functional units are realized by the CPU 23 illustrated in FIG. 2 executing the programs stored in the SDRAM 21 or by the image processing block 26, for example.

The calculator 40 calculates an evaluation value for evaluation of each image using the pixel value of one or more pixels in each of overlapping regions. The evaluation value may be an average value or a variance value of pixel values of a plurality of pixels in each overlapping region, for example. When RGB color space is employed in a color image, each of pixel values may include the amounts of signals in colors of RGB. When YCbCr color space is employed, each of pixel values may include values of brightness, hue and intensity of blue color, and hue and intensity of red color.

The determination controller 41 determines whether there is an image to be corrected in the plurality of images according to the evaluation value calculated by the calculator 40. For example, the determination controller 41 has a threshold to make determination on the presence or absence of an image to be corrected by comparison with the threshold. Specifically, the determination controller 41 determines an image with the average value or variance value larger than the threshold as an image to be corrected. When there is such an image, the determination controller 41 determines that there is an image to be corrected.

When the determination controller 41 determines that there is an image to be corrected, the image determiner 42 determines a correction reference image as a reference for correction, from among the plurality of images, according to the evaluation value calculated by the calculator 40. The correction reference image may be selected from among the plurality of images excluding the image to be corrected. For example, the correction reference image may be an image that is different from the image to be corrected and is to be combined with the image to be corrected. In the case of the omnidirectional imaging camera 10 described above, when one of the images is an image to be corrected, the other may be determined as a correction reference image.

The image corrector 43 corrects the image to be corrected according to the correction reference image determined by the image determiner 42. The image corrector 43 corrects the image to be corrected such that its brightness and color approximate to the brightness and color of the correction reference image. The correction allows reduction of differences in brightness and color between the plurality of images to be combined.

Figure 11:
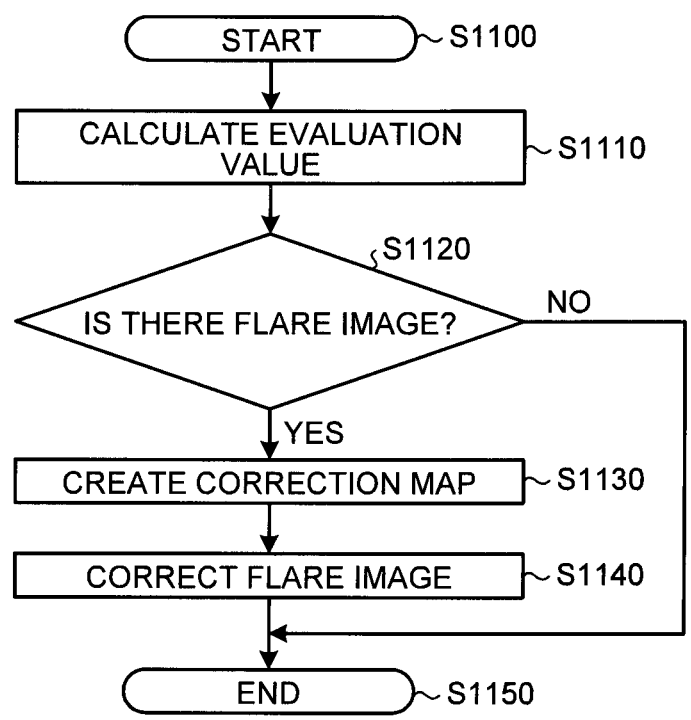
FIG. 11 is a flowchart of the entire process performed by the image processing system.

Referring to FIG. 11, a process performed by the image processing system will be described. The image processing system starts the process at step S1100 upon receipt of two fish-eye images taken by the two imaging elements 13 and 14. At step S1110, the calculator 40 calculates the evaluation value for evaluation of each of the images using the pixel value of one or more pixels in each of overlapping regions of the two fish-eye images.

At step S1120, the determination controller 41 determines whether there is an image with a flare (flare image) in the two fish-eye images, according to the evaluation value calculated by the calculator 40. At step S1120, when there is a flare image, the process is moved to step S1130, and when there is no flare image, the process is moved to step S1150 and terminated.

At step S1130, the image determiner 42 determines the image with no flare as a correction reference image, and the image corrector 43 uses the evaluation value calculated at step S1110 to create a correction map in which correction values for correction of the flare image are mapped. At step S1140, the image corrector 43 corrects the flare image using the created correction map. After completion of the correction, the process is moved to step S1150 and terminated.

The calculation of the evaluation value at step S1110 in FIG. 11 will be described with reference to FIG. 12. The evaluation value is calculated using the pixel value of one or more pixels in the overlapping region, which requires acquisition of the pixel value of one or more pixels in the overlapping region 30 shown by vertical stripes in (a) in FIG. 12. One method for acquisition will be described below. The following method is an example, and any other method for calculating the evaluation value can be used.

First, as illustrated in (a) in FIG. 12), each of two input fish-eye images is divided into a plurality of a predetermined number of rectangular evaluation sections with the same size. For example, when the size of each of the fish-eye image is 1952 (pixels)×1932 (pixels), the fish-eye image may be divided into 48×48 sections. This number of sections is an example, and thus any other optimum number of sections may be determined by experiment or the like and employed. The image processing system may include, as a functional unit for such division, a region divider configured to divide an image into a plurality of evaluation sections.

Next, as illustrated in (b) in FIG. 12, all of the evaluation sections included in the overlapping region 30 shown by vertical stripes, are detected as evaluation sections corresponding to the overlapping region 30. In (b) in FIG. 12, detected evaluation sections 35 are shown in gray. The image processing system may include a section detector as a functional unit for such detection.

Each of the detected evaluation sections 35 is composed of a plurality of pixels. Each of the pixels has a pixel value. The evaluation value may be calculated by summing the pixel values, dividing the sum of pixel values by the number of pixel values to determine an average value in all of the evaluation sections 35, summing the average values determined in all of the evaluation sections, and then dividing the sum of average values by the number of evaluation sections to determine an average value. Alternatively, the evaluation value may be calculated by determining a variance value of the average values determined in all of the evaluation sections. Therefore, the evaluation value may be determined using the foregoing average value or variance value. The image processing system may include, as a functional unit, an average value calculator for calculation of average values in the evaluation sections.

In the case of 360° imaging by the omnidirectional imaging camera 10 structured as illustrated in FIG. 1, the photographer's finger pressing the imaging SW 15 may be significantly reflected. In such a case, the finger is seen in one overlapping region 30 but is not seen in the other overlapping region 30. Accordingly, the calculated average values or variance values significantly vary depending on the presence or absence of the reflection of the finger. Thus, the portion of the finger in the image is preferably not used for the calculation of the evaluation value.

Accordingly, the sections at the lower ¼ portion of the overlapping region 30 with possible reflection of the finger may be set as unnecessary sections, and the other evaluation sections included in the overlapping region 30 may be detected as evaluation sections 35 corresponding to the overlapping region 30. In this example, the sections at the lower ¼ portion of the overlapping region are set as unnecessary sections, but this embodiment is not limited to this. Alternatively, the sections at the ⅕ or less portion or ⅓ or more portion of the overlapping region may be set as unnecessary sections, or other sections may be added as unnecessary sections.

By setting the unnecessary sections to exclude an obstacle such as a finger from the evaluation target, it is possible to determine average values or variance values in only the evaluation sections with high correlation between the flare image and the correction reference image.

Figure 13:
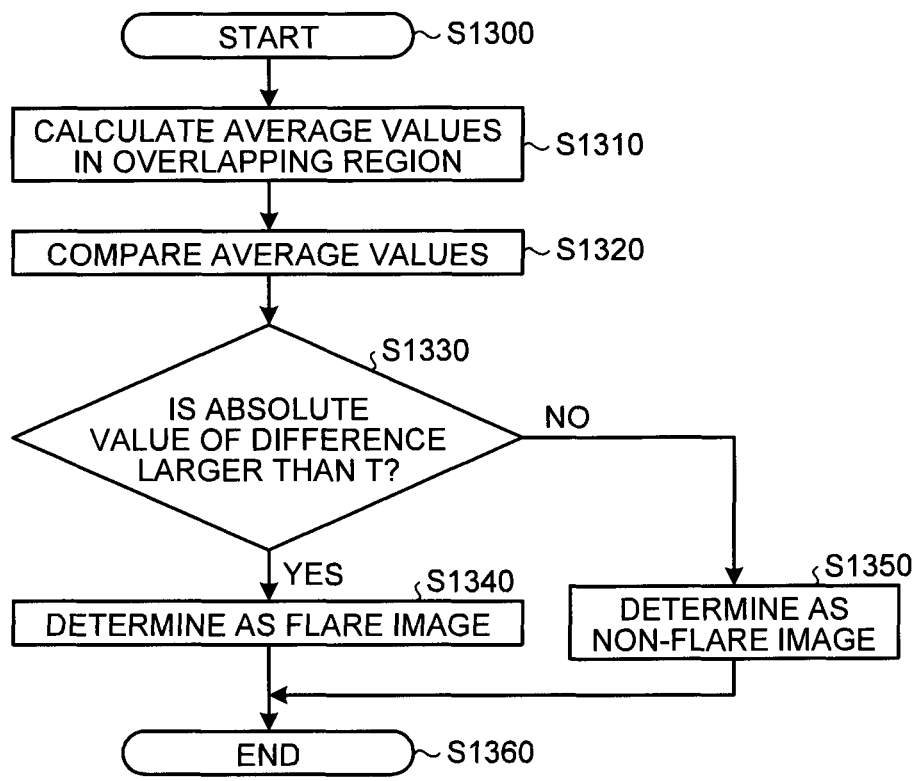
FIG. 13 is a flowchart of a detailed process for determination at step S1120 described in FIG. 11.

The determination on the presence or absence of a flare image at step S1120 in FIG. 11 will be described with reference to FIG. 13. This process is started at step S1300 upon calculation of the evaluation values. At step S1310, all the average values in the evaluation sections corresponding to the overlapping region, calculated as the evaluation values, are averaged. This step is carried out for each of images to be connected. Therefore, when two images are to be connected, the average value is calculated for each of the two images.

At step S1320, the calculated average values are compared between the images to be connected. In this example, the absolute value of a difference in average value is calculated and the image with the smallest average value is extracted. Then, the information is output as comparison results. For example, when images P and Q are to be connected and their average values are designated as AVE_P and AVE_Q, the comparison result is the image Q when |AVE_P−AVE_Q| and AVE_P>AVE_Q, or the image P when AVE_P<AVE_Q.

At step S1330, it is determined whether the absolute value of the difference in the comparison result is larger than a preset threshold T. When the absolute value is larger, the difference in brightness or the like is large and thus the process is moved to step S1340 to determine that a flare has occurred and the image is a flare image. In contrast, when the absolute value is smaller, the difference is small and thus the process is moved to step S1350. In this case, it is not determined that a flare has occurred or the image is a flare image. Upon completion of the determination, the process is moved to step S1360 and terminated.

The image with the smallest average value obtained by comparison and extraction at step S1320 can be determined as an image with no flare and a correction reference image. Basically, when two images are taken by simultaneous exposure, the images should include overlapping regions representing the same subject at the same brightness. However, when a flare has occurred in one image, the average value in the overlapping region becomes higher. Accordingly, setting the threshold as described above makes it possible to, when an image has an average value larger than the threshold, determine the image as a flare image. The image with the smallest average value has highly possibly no flare and thus can be used as a correction reference image.

The creation of the correction map at step S1130 illustrated in FIG. 11 will be described with reference to FIG. 14. When it is determined that there is a flare image, this process is started at step S1400. At step S1410, a correction exclusion map is created to specify sections to be excluded from correction. In the correction exclusion map, a correction exclusion value is stored in blocks at positions corresponding to the evaluation sections included in the correction exclusion sections, in which no correction is made, of the image to be corrected determined according to the pixel values of a plurality of pixels constituting the image to be corrected. A non-correction exclusion value is stored in the other blocks. The image processing system may include, as a functional unit, a section determiner configured to determine the correction exclusion sections for creation of the correction exclusion map.

When an image with a flare is to be corrected based on an image with the smallest average value and with no flare, the entire image with a flare is corrected. Making correction to the entire image would entirely reduce brightness and bring about color change. Accordingly, the combined image may appear unnatural. For example, the actual brightness and color of alight source are reflected on the brightness and color of the image with a flare, but the correction is made to reduce the brightness and darken the color. Therefore, the correction exclusion map is created such that no correction is made to the image of a subject that is not to be corrected such as a light source.

At step S1420, the amounts of correction to the overlapping region are calculated from the evaluation values such as average values or variance values in the evaluation sections corresponding to the overlapping region. The amounts of correction are intended to quantify the degree to which the brightness is to be reduced and the degree to which the color is to be changed. At step S1430, the amounts of correction to the entire image to be corrected, that is, the entire image with a flare, are calculated by interpolation based on the amounts of correction calculated at step S1420, and a correction map is created using the calculated amounts of correction. In the correction map, the calculated amounts of correction are stored in blocks at positions corresponding to the evaluation sections in the image to be corrected.

At step S1440, the correction exclusion map created at step S1410 is applied to the correction map created at step S1430 to modify the correction map. Then at step S1450, when the correction values in the correction map includes any extremely high value or low value, a leveling process, that is, low-pass filter (LPF) processing is performed to level out these values. The LPF may be a Gaussian filter.

The LPF processing may be performed once or more. Nevertheless, the number of iterations of the LPF processing is preferably smaller. This is because, when the LPF processing is performed a large number of times, the correction values in the image excluded from the correction change largely, which makes the correction exclusion meaningless. In the embodiment described in FIG. 14, the LPF processing is performed twice as described at step S1460. The image processing system may further include a leveling processor as a functional unit for performing the leveling process.

At step S1460, it is determined whether the LPF processing has been performed twice. When the LPF processing has not been performed twice, the process is returned to step S1440. When the LPF processing has been performed twice, the process is moved to step S1470. At step S1470, a resizing process for the correction map is performed. The resizing process is intended to change the number of evaluation sections included in the correction map to the number of pixels in the image to be corrected. Accordingly, the image processing system may include a resizer as a functional unit.

The correction map created at step S1440 and earlier is sized according to the numbers of horizontal and vertical divisions of a fish-eye image as illustrated in FIG. 12. That is, when the fish-eye image is divided into 48×48, the size of the correction map is 48×48. In the foregoing example, the actual size of the fish-eye image is 1952 (pixels)×1932 (pixels). Thus, the resizing process is performed to change the size from 48×48 to 1952×1932. Upon completion of the resizing process, the process is moved to step S1480 and terminated.

The resizing may be performed by any known method. For example, the size may be changed by a bilinear, nearest neighbor, or bicubic method, for example.

A method for creating the correction exclusion map at step S1410 in FIG. 14 will be described with reference to FIG. 15. In FIG. 15, referring to (a), in an image with reflection of a light source 50, a portion of the image representing the light source 50 is set as an image of a subject to be excluded from correction. First, as illustrated in (b) in FIG. 15, the entire image is divided into a plurality of evaluation sections, and the average values or variance values in the evaluation sections are calculated, and then it is determined whether each of the evaluation sections constitutes a correction exclusion section. This determination may be made by the section determiner described above.

The condition for a correction exclusion section may be "high brightness and achromatic color" or "high brightness and the maximum value of brightness equal to or more than a threshold". Under "high brightness and achromatic color" as Condition 1, for example, the high brightness may be set at 200 or more in the case where the brightness value falls within 0 to 255, and the achromatic color may be set −1 to 1 in the case where the color difference value falls within −127 to 127. Under "high brightness and the maximum value of brightness equal to or more than a threshold" as Condition 2, for example, the high brightness may be set at 230 or more in the case where the brightness value falls within 0 to 255, and the threshold value may be set at 250 in the case where the brightness value falls within 0 to 255. These values are examples and the present invention is not limited to these values.

The correction exclusion section may be determined under both of Conditions 1 and 2 desirably. When one entire evaluation section has uniform brightness and color, the correction exclusion section may be determined only under Condition 1. However, when a high-brightness subject such as the light source 50 and a low-brightness subject such as a tree branch are seen in one evaluation section, Condition 1 is not applicable and thus the image of the light source 50 is corrected and turned to a dark, unnatural image. Making determination under Condition 2 as well as Condition 1 makes it possible to extract appropriately the portions representing the light source 50 and the tree branch as correction exclusion sections.

Referring to (b) in FIG. 15, as sections meeting these conditions, eight sections 51 are extracted. The correction exclusion map is formatted in the same manner as that for division of an image to be corrected into a plurality of evaluation sections. The correction exclusion map stores "1" as a value indicative of correction exclusion in blocks at positions corresponding to the evaluation sections meeting the conditions as illustrated in (c) in FIG. 15. The correction exclusion map stores "0" as a value indicative of non-correction exclusion in blocks at positions corresponding to the evaluation sections not meeting the conditions.

The method for calculating the amount of correction at step S1420 in FIG. 14 will be described with reference to FIG. 16. In FIG. 16, (a) illustrates a flare image and a reference image, and (b) includes enlarged views of evaluation sections 35 included in the overlapping regions 30 shown by dotted lines of (a). The evaluation sections 35 corresponding to the connecting position are given the same reference codes. Specifically, the evaluation section with reference code a extracted from the flare image in the left view of (b) in FIG. 16 and the evaluation section with reference code a extracted from the reference image in the right view of (b) in FIG. 16 are to be connected. This is because the omnidirectional imaging camera 10 takes images of front and back sides at the same time and thus the images in the overlapping regions are 180° rotated relative to each other.

When the two images are connected, of the values of the two evaluation sections with reference code a, one is higher due to occurrence of a flare and the other is lower due to non-occurrence of a flare. Accordingly, correction is made to equalize these values. The amount of correction c for use in the correction can be calculated by the following Equation (2) or (3). In Equation (2), $E_b$ denotes the evaluation value of the reference image as a correction reference image, and $E_t$ denotes the evaluation value of the image to be corrected, that is, the flare image.

$$C = \frac{E_b}{E_t} \qquad (2)$$

$$C = E_b - E_t \qquad (3)$$

The amount of correction c may be calculated by the foregoing equation 2 or 3. The calculated amount of correction c is stored as a value of the evaluation sections corresponding to the flare image. Therefore, when the amount of correction c is calculated for the reference code a illustrated in (b) in FIG. 16, the amount of correction c is stored as a value of the reference code a.

Figure 17:
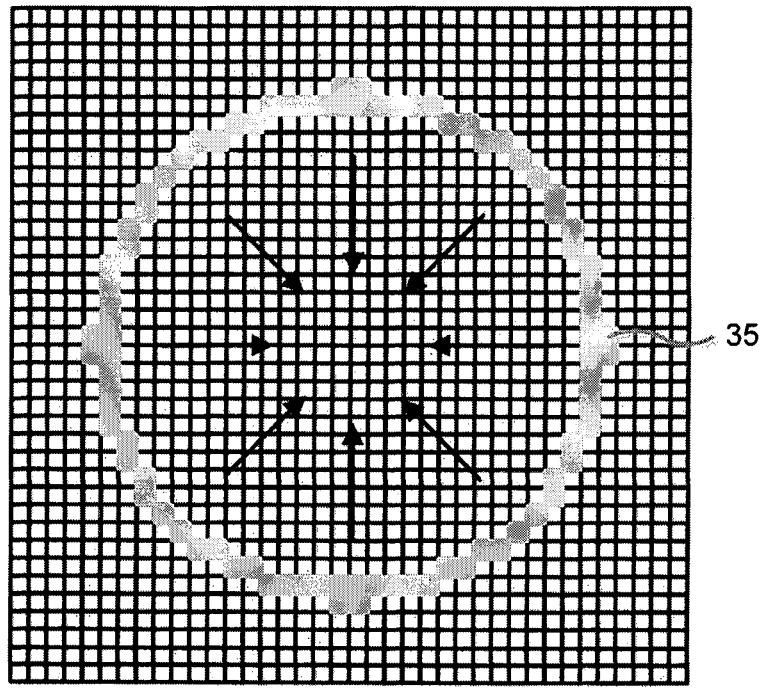
FIG. 17 is a diagram describing a method for calculating the amounts of correction to the entire image from the amounts of correction to the overlapping region.

The interpolation between the amounts of correction at step S1430 in FIG. 14 will be described with reference to FIG. 17. The amounts of correction c to the overlapping region are calculated using Equation (2) or (3). For the inside of the overlapping region, the amounts of correction calculated for the plurality of evaluation sections 35 in the overlapping region are used to interpolate the amounts of correction toward the center of the image as shown by arrows in (a) in FIG. 17, thereby determining the amounts of correction to the inside evaluation sections. The method for the determination will be described later in detail.

For the outside of the overlapping region, the LPF process is performed at subsequent step S1450. Thus, it is necessary to set the amounts of correction in the overlapping region that would not change largely even when the LPF process is performed. As illustrated in (b) in FIG. 17, for example, each of evaluation sections x is corrected by the same amount of correction as the amount of correction to the immediately upper evaluation section, and each of evaluation sections y is corrected by the same amount of correction as the amount of correction to the immediately left evaluation section. The amount of correction to which of the evaluation sections to be used can be determined in advance.

The modification of the correction map at step S1440 in FIG. 14 will be described with reference to FIG. 18. In FIG. 18, (a) illustrates a portion of the correction map created by the process described in FIG. 14, and (b) illustrates a portion of the correction exclusion map illustrated in (c) in FIG. 15. The correction map illustrated in (a) in FIG. 18 stores the ratios between evaluation values expressed by Equation 2, as the amounts of correction to the evaluation sections.

At the modification of the correction map illustrated in (a) in FIG. 18, reference is made to the correction exclusion map illustrated in (b) in FIG. 18. When the amount of correction to the corresponding evaluation sections in the correction exclusion map is "0", no modification is made for the evaluation sections. In contrast, when the amount of correction is "1" in the correction exclusion map, the value is changed such that no correction is made to the amount of correction. Referring to (b) in FIG. 18, an amount of correction of 1 is stored in the evaluation sections in coordinates (x3, y2), (x3, y3), and (x4, y2), and thus the values of blocks at the same positions as those in the correction map are changed to 1.00, thereby modifying the correction map. Accordingly, the correction map can be modified to make the correction less effective in the corresponding correction exclusion sections.

Figure 14:
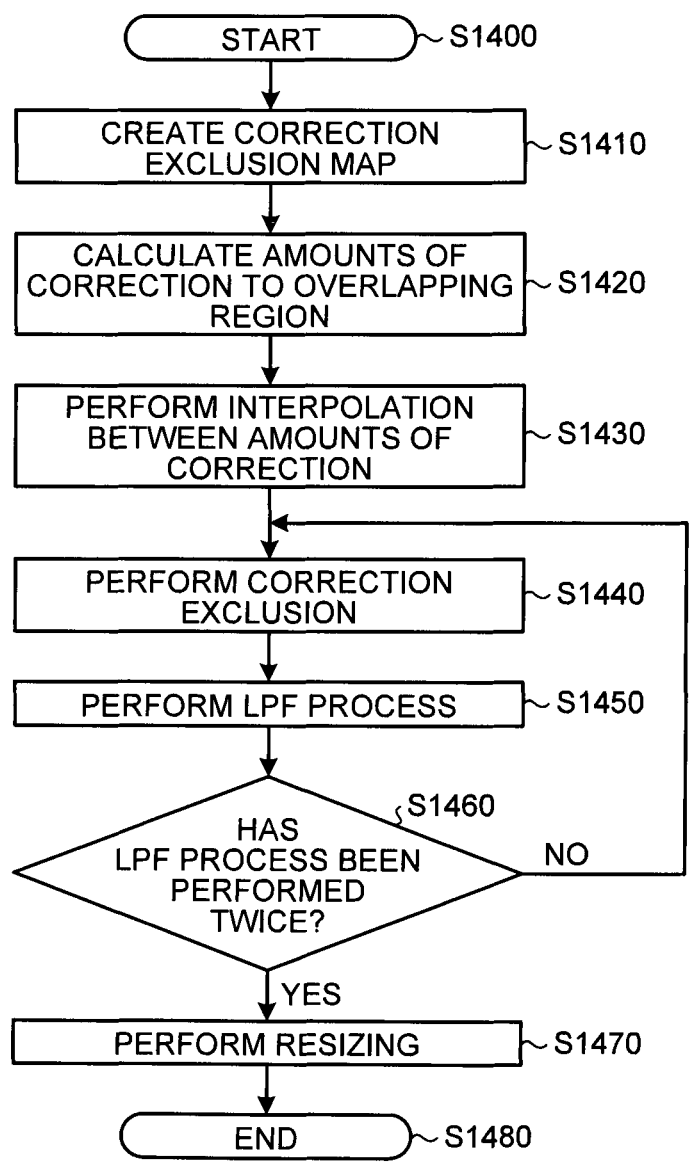
FIG. 14 is a flowchart of a detailed process for creation of a correction map at step S1130 described in FIG. 11.

The flare image is corrected by the use of the correction map after the execution of the resizing process in FIG. 14. By the resizing process, the correction map has an image size with the same number of pixels as those of the flare image. When the correction map stores the amounts of correction to the pixels determined using the ratios between evaluation values calculated by Equation (2), the pixel values of the pixels in the flare image are multiplied by the corresponding amounts of correction to the pixels, thereby to correct the pixel values of the pixels in the flare image. When the correction map stores the amounts of correction to the pixels determined from the differences in the evaluation values calculated by Equation (3), the corresponding amounts of correction to the pixels are added to the pixel values of the pixels in the flare image, thereby to correct the pixel values of the pixels in the flare image.

In the case of a monochrome image, one correction map is created for a flare image. In the case of a color image, a flare image is composed of three planes and thus three correction maps are created. Specifically, when the color image is an RGB image, the flare image is composed of three planes of red, blue, and green colors and three correction maps for correction of the planes are created and used for correction of the flare image.

The flare image can be corrected in such a manner, which allows reduction of differences in brightness and color in the combined image. In addition, portions representing a light source and the like can be excluded from the correction so that no correction is made to the portions representing the light source and the like, which causes no darkening of the portions representing the light source to prevent color shift in color saturated portions. Further, performing the leveling process with the LPF on the correction map makes it possible to eliminate acute changes in the amounts of correction, and ease differences in the pixel values between the light source excluded from the correction and its peripheral sections to prevent unnatural correction.

Figure 19:
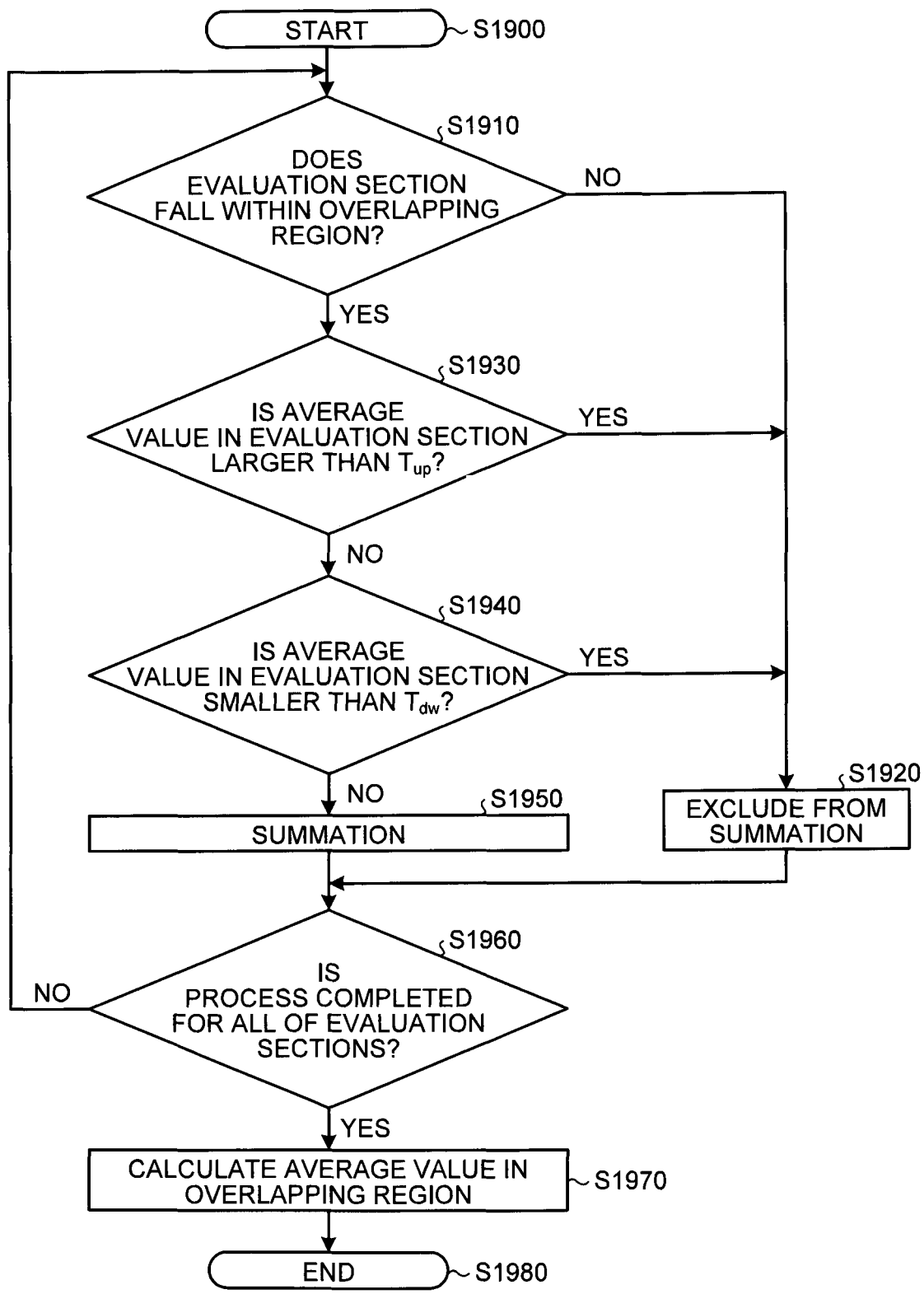
FIG. 19 is a flowchart of a process for calculating an average value in the overlapping region at step S1310 described in FIG. 13.

Another example of the calculation of the average value in the overlapping region at step S1310 in FIG. 13 will be described with reference to FIG. 19. In the example of FIG. 13, the average values are calculated from all of the evaluation sections in the overlapping region. Meanwhile, in the example of FIG. 19, the average values are calculated under conditions set in advance for sorting of the evaluation sections. Specifically, prior to the execution of the process, thresholds (upper limit $T_{up}$ and lower limit $T_{dw}$) are set in advance for average values in the evaluation sections, and the thresholds are set as upper limit value and lower limit value.

This process is started at step S1900. At step S1910, any one of the evaluation sections is selected, and it is determined whether the evaluation section falls within the overlapping region. The evaluation section may be selected in sequence from that at the upper left corner of the image, for example. This is a mere example and thus the evaluation section may be selected by any other method.

When the evaluation section does not fall within the overlapping region, the process is moved to step S1920 and the average value in the evaluation section is excluded from summation. That is, the average value is not subjected to summation. In contrast, when the evaluation section falls within the overlapping region, the process is moved to step S1930 to determine whether the average value in the evaluation section is larger than the upper limit $T_{up}$. When the average value is larger than the upper limit $T_{up}$, the process is moved to step S1920 and the average value in the evaluation section is excluded from summation. When the average value is the same as or smaller than the upper limit $T_{up}$, the process is moved to step S1940 to determine whether the average value in the evaluation section is smaller than the lower limit $T_{dw}$. When the average value is smaller than the lower limit $T_{dw}$, the process is moved to step S1920 and the average value in the evaluation section is excluded from summation. When the average value is the same as or larger than the lower limit $T_{dw}$, the process is moved to step S1950 and the average value in the evaluation section is subjected to summation.

When the average value is excluded from summation at step S1920 or is subjected to summation at step S1950, the process is moved to step S1960 to determine whether the process is completed for all of the evaluation sections. When the process is not yet completed for all of the evaluation sections, the process is returned to step S1910 to perform the same process on the next evaluation section. When the process is completed for all of the evaluation sections, the process is moved to step S1970 to divide the summation of average values in the evaluation sections of the overlapping region by the number of evaluation sections to calculate the average value in the overlapping region. This process is terminated at step S1980.

The upper limit $T_{up}$ and the lower limit $T_{dw}$ may be determined to allow appropriate exclusion of the evaluation sections to be excluded from summation, taking into account influence on the determination on the presence or absence of a flare image.

Figure 20:
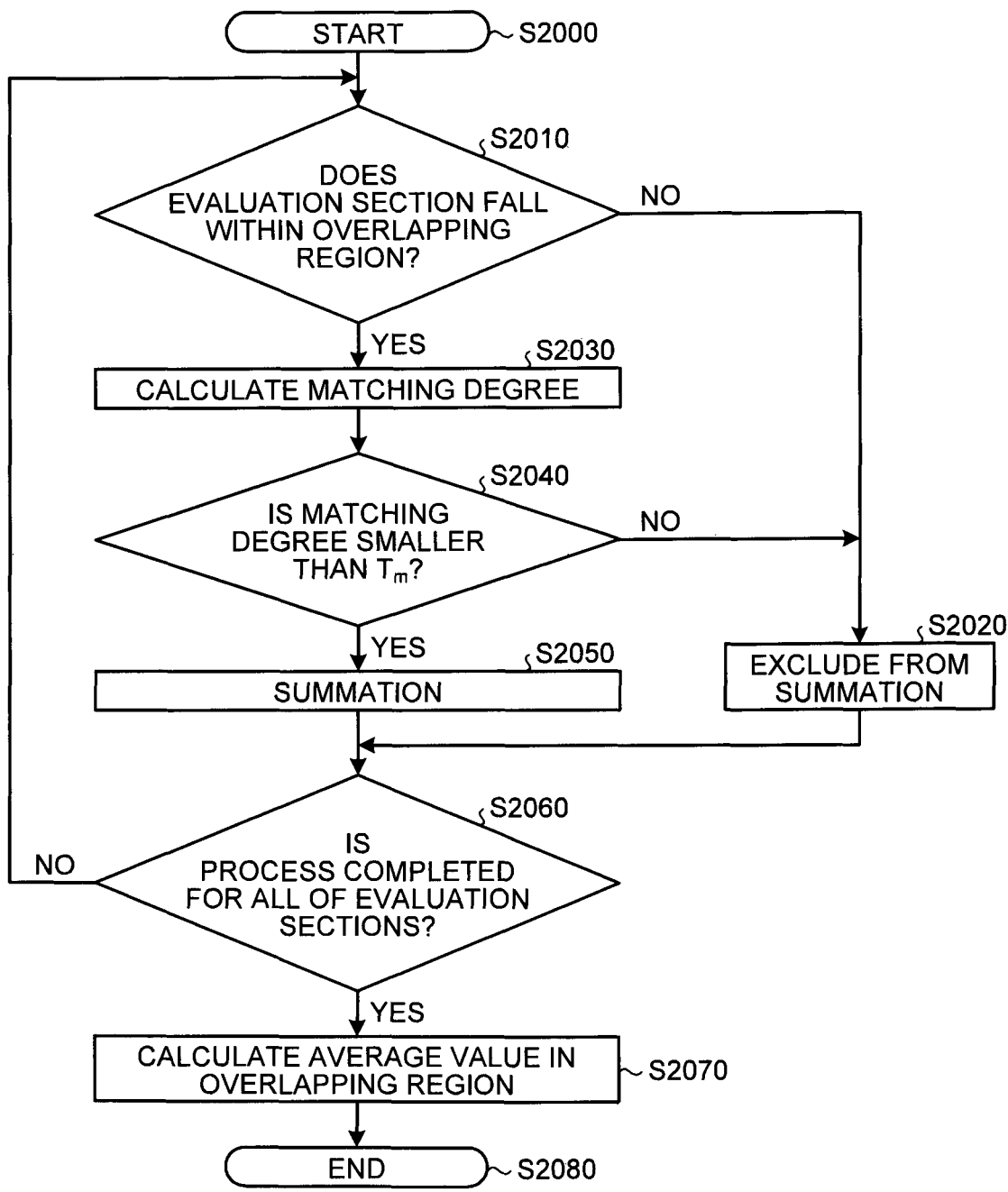
FIG. 20 is a flowchart of another process for calculating an average value in the overlapping region at step S1310 described in FIG. 13.

Still another example of the calculation of the average value in the overlapping region at step S1310 in FIG. 13 will be described with reference to FIG. 20. In the example of FIG. 19, the upper limit $T_{up}$ and the lower limit $T_{dw}$ are set as thresholds. In the example of FIG. 20, an index called degree of coincidence (matching degree) is set as a threshold, and the evaluation sections are determined to be subjected to summation or excluded from summation according to the matching degree. The matching degree is an index indicating the degree of coincidence between each of the evaluation sections in the overlapping region of a correction reference image and each of the evaluation sections in the overlapping region of a flare image as an image to be corrected. The image processing system may include, as a functional unit, a coincidence degree calculator configured to calculate the matching degree.

This process is started at step S2000. At step S2010, it is determined whether the evaluation section falls within the overlapping region. When the evaluation section does not fall within the overlapping region, the process is moved to step S2020 and the average value in the evaluation section is excluded from summation. When the evaluation section falls within the overlapping region, the process is moved to step S2030 to calculate the matching degree of the evaluation section. The matching degree and the method for calculating the matching degree will be described later. At step S2040, it is determined whether the calculated matching degree is smaller than a matching degree threshold $T_m$ as a preset threshold for degree of coincidence.

When the calculated matching degree is larger than the matching degree threshold $T_m$, the process is moved to step S2020 and the average value in the evaluation section is excluded from summation. When the calculated matching degree is the same or smaller than the matching degree threshold $T_m$, the process is moved to step S2050 to subject the average value in the evaluation section to summation. When the evaluation section is excluded from summation at step S2020 or when the evaluation section is subjected to summation at step S2050, the process is moved to step S2060 to determine whether the process is completed for all of the evaluation sections. When the process is not yet completed, the process is returned to step S2010 to perform the same process on the next evaluation section. When the process is completed, the process is moved to step S2070 to divide the summation of the average values in the evaluation sections of the overlapping region by the number of evaluation sections to calculate the average value in the overlapping region. This process is terminated at step S2080.

Figure 21:
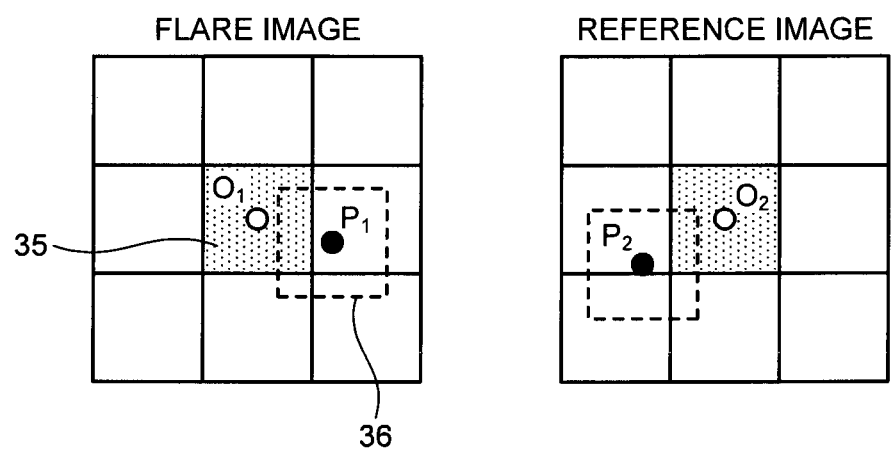
FIG. 21 is a diagram describing a method for calculating a matching degree at step S2030 described in FIG. 20.

Referring to FIG. 21, the matching degree and the method for calculating the matching degree used with reference to FIG. 20 will be described. The relationship between the connecting position and the evaluation section is as shown in FIG. 16. However, the image is divided evenly in the horizontal and vertical directions, and thus the connecting position and the evaluation section are not completely coincident with each other.

For example, as illustrated in FIG. 21, the evaluation sections 35 are shown in gray and the coordinates at the centers of the evaluation sections are set at $O_1$ and $O_2$. In addition, the connecting positions detected by template matching or the like are designated as $P_1$ and $P_2$, and the sections shown by dotted lines with the same size as that of the evaluation sections, centered on the connecting positions, are designated as connecting sections 36.

The image of the subject in the connecting section 36 is equal between the flare image and the reference image. When the center $O_1$ in the evaluation section 35 and the center $P_1$ in the connecting section 36 are coincident with each other and the center $O_2$ in the evaluation section 35 and the center $P_2$ in the connecting section 36 are coincident with each other, respectively, the evaluation section 35 and the connecting section 36 are coincident with each other. Accordingly, the images of the subject in the evaluation sections 35 are coincident with each other.

However, when there is no coincidence in either of the central coordinates, the images of the subject in the evaluation sections 35 are not coincident with each other. In the case of a subject with few gradations such as the sky or a flat wall, there arises less influence on the evaluation values even when the images of the subject are not completely coincident with each other. On the other hand, in the case of a subject with many gradations, slight shifts in the images make differences in brightness and color with large influence on the evaluation values. Accordingly, the matching degree as an index is used to determine whether the images of the subject in the evaluation sections 35 are coincident with each other.

The matching degree can be calculated by the following Equation (4) or (5) using a variance value calculated for each of the evaluation sections 35. In Equation (4), m denotes the matching degree, $\sigma_1$ the variance value of a flare image, and $\sigma_2$ the variance value of a reference image. In Equation (5), $v_1$ denotes the brightness value of a flare image, and $v_2$ the brightness value of a reference image.

$$m = |\sigma_1 - \sigma_1| \quad (4)$$

$$m = |V_1 \times V_2 - V_2^2| \quad (5)$$

The matching degree m in Equation (4) is defined by the absolute value of a difference in variance value between the flare image and the reference image. In general, the images of the subject are more coincident with each other with increase in the matching degree. In this example, however, the images of the subject are more coincident with each other with decrease in the matching degree. The variance value tends to be higher with more gradations in the image of the subject, and tends to be lower with fewer gradations in the image of the subject. Accordingly, even a small shift in the image of the subject with more gradations has larger influence on the matching degree. On the other hand, even a large shift in the image of the subject with fewer gradations has smaller influence on the matching degree.

The pixel values for use in calculation of the matching degree may be pixel values of all the pixels. However, using all the pixel values would result in higher calculation costs. Preferably used are only pixel values of pixels having influence on the brightness of the image. Such pixel values may be the value of G in an RGB image or the value of Y in an YCbCr image.

In Equation (5), the matching degree is calculated with the use of the brightness value, not using the variance value. The matching degree m in Equation (5) is defined by the absolute value of a difference in brightness value, which means that the images of the subject are more coincident with each other with decrease in the matching degree, as in the case of Equation (4).

One example of the method for interpolation between the amounts of correction in FIG. 17 will be described with reference to FIG. 22. The average values in the plurality of evaluation sections 35 in the overlapping region 30 shown in gray in (a) in FIG. 22 are averaged to calculate the average value in the overlapping region. The calculated average value is set as the amount of correction to a diagonally shaded portion at the center of the overlapping region 30.

As illustrated in (b) in FIG. 22, the center is designated as C, the overlapping section at the intersection of lines extended horizontally and vertically from the center C toward the overlapping region is designated as O, the section to be calculated between the center C and the overlapping section O is designated as T, and the amounts of correction to the section T are designated as $r_c$, $r_o$, and $r_t$. In addition, the distance between the center C and the section T is designated as $d_1$, and the distance between the section T and the overlapping section O is designated as $d_2$. Accordingly, the amount of correction $r_t$ to the section T can be expressed by the following Equation (6) in which weighted averaging is performed with the distance as a weight.

$$r_t = \frac{r_c \times d_2 + r_o \times d_1}{d_1 + d_2} \quad (6)$$

Using Equation (6), the amounts of correction to the sections extended vertically and horizontally from the center C toward the overlapping region in (b) in FIG. 22 are calculated. The amounts of correction to the sections shown in white between the calculated sections shown in gray to which the amount of correction has been calculated and the overlapping region as illustrated in (c) in FIG. 22 can be calculated by weighted averaging according to the distances between the calculated sections and the overlapping region.

The section to be calculated is designated as T, and the intersection between a line extended vertically upward from the section T and the calculated section is designated as H. In addition, the intersection between a line extended vertically downward from the section T and the overlapping region is designated as $O_1$, the intersection between a line extended horizontally rightward from the section T and the calculated section is designated as V, and the intersection between a line extended horizontally leftward from the section T and the overlapping region is designated as $O_2$. The distance between the section T and the section V is designated as $d_{h1}$, the distance between the section T the section $O_2$ is designated as $d_{h2}$, the distance between the section T and the section H is designated as $d_{v1}$, and the distance between the section T and the section $O_1$ is designated as $d_{v2}$. In addition, the amounts of correction to the sections T, H, V, $O_1$, and $O_2$ are designated as $r_t$, $r_h$, $r_v$, $r_{o1}$, and $r_{o2}$, respectively. Accordingly, the amount of correction $r_t$ to the section T can be calculated by the following Equation (7).

$$r_t = \frac{1}{2} \times \left\{ \frac{r_h \times d_{v2} + r_{o1} \times d_{v1}}{d_{v1} + d_{v2}} + \frac{r_v \times d_{h2} + r_{o2} \times d_{h1}}{d_{h1} + d_{h2}} \right\} \quad (7)$$

Using Equations (6) and (7), the amounts of correction to all of the evaluation sections on the inside of the overlapping region can be calculated.

According to the method for interpolation between the amounts of correction illustrated in FIG. 22, the interpolation is uniformly performed in any direction. Such uniform interpolation has no problem when the images of the same subject exist in the overlapping region between the images to be connected. However, the uniform interpolation causes a problem when the images of different subjects exist in the overlapping region due to the presence of an obstacle, for example, in a case where one of the images has reflection of the finger as described above as a subject. In such a case, interpolation cannot be uniformly performed. Accordingly, interpolation is performed in a specific direction as in this example. The method for the interpolation will be described with reference to FIG. 23.

As illustrated in (a) in FIG. 23, for example, three evaluation sections $O_1$, $O_2$, and $O_3$ in the overlapping region are used to calculate the amounts of correction sequentially downward from the section one stage below the vertical top of the overlapping region. First, the section $T_1$ on the inside of the overlapping region in contact with the evaluation section on the top of the overlapping region illustrated in (a) in FIG. 23 is set as a section to which the amount of correction is to be calculated. The amount of correction is calculated using amounts of correction $r_1$, $r_2$, and $r_3$ to the evaluation section $O_1$ one stage above the section $T_1$ and in contact with the inside of the overlapping region, the evaluation sections $O_2$ and $O_3$ at the right and left of the section $T_1$ and in contact with the inside of the overlapping region, the distance $d_1$ between the section $T_1$ and the section $O_2$, and the distance $d_2$ between the section $T_1$ and the section $O_3$. The amount of correction $r_{t1}$ can be calculated by the following Equation (8).

$$r_{t1} = \frac{1}{2} \times \left\{ r_1 + \frac{r_2 \times d_2 + r_3 \times d_1}{d_1 + d_2} \right\} \quad (8)$$

Using Equation (8), the amounts of correction are calculated for all of the sections on the inside of the overlapping region in the horizontal direction at the right and left of the section $T_1$ illustrated in (b) in FIG. 23. Next, amount of correction $r_{t2}$ for a section $T_2$ one stage below the section $T_1$ on the inside of the overlapping region is calculated. The amount of correction $r_{t2}$ is calculated by the use of amount of correction $r_p$ to a section P one stage above the section $T_2$, amounts of correction $r_4$ and $r_5$ for evaluation sections $O_4$ and $O_5$ in contact with the inside of the overlapping region in the horizontal direction, a distance $d_3$ between the section $T_2$ and the section $O_4$, and a distance $d_4$ between the section $T_2$ and the section $O_5$. The amount of correction $r_{t2}$ can be calculated by the following Equation (9). Repeating the calculation in the vertically downward direction makes it possible to calculate the amounts of correction to all of the sections on the inside of the overlapping region.

$$r_{t2} = \frac{1}{2} \times \left\{ r_p + \frac{r_4 \times d_4 + r_5 \times d_3}{d_3 + d_4} \right\} \quad (9)$$

When there is any evaluation section with an extremely large or low amount of correction in the overlapping region, the amount of correction may expand entirely by interpolation to bring about an unnatural image.

On the creation of the correction exclusion map at step S1410 in FIG. 14, an average coordinate value in the blocks as correction exclusion sections may be calculated to determine the average coordinate value as the center of the correction exclusion sections. The amounts of correction are set such that no correction is made to a predetermined region including the determined center (central region), and interpolation is performed toward the central region. This makes it possible to minimize the spread of extremely large or small amounts of correction.

Figure 24:
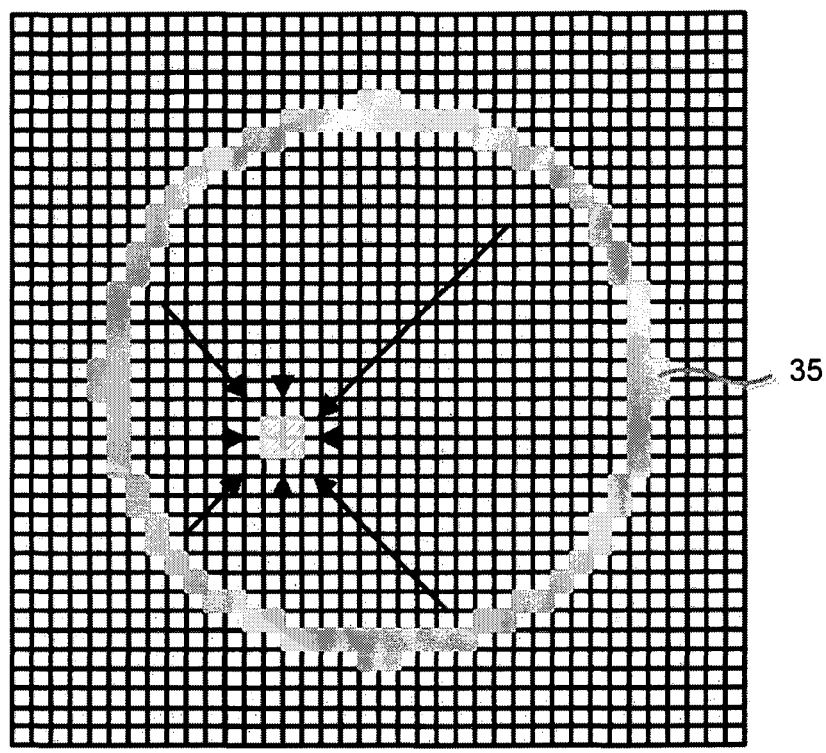
FIG. 24 is a diagram describing interpolation between the amounts of correction at step S1430 described in FIG. 14.

When the central region among the correction exclusion sections is as a diagonally shaded region illustrated in FIG. 24, the central region is set as an interpolation reference region, and the amounts of correction to the evaluation sections on the inside of the overlapping region are calculated by interpolation between the surrounding overlapping region and the interpolation reference region. The amounts of correction can be calculated by weighted averaging as expressed in the foregoing equations 6 and 7. Alternatively, the amounts of correction may be calculated by the use of Equations (8) and (9).

Figure 25:
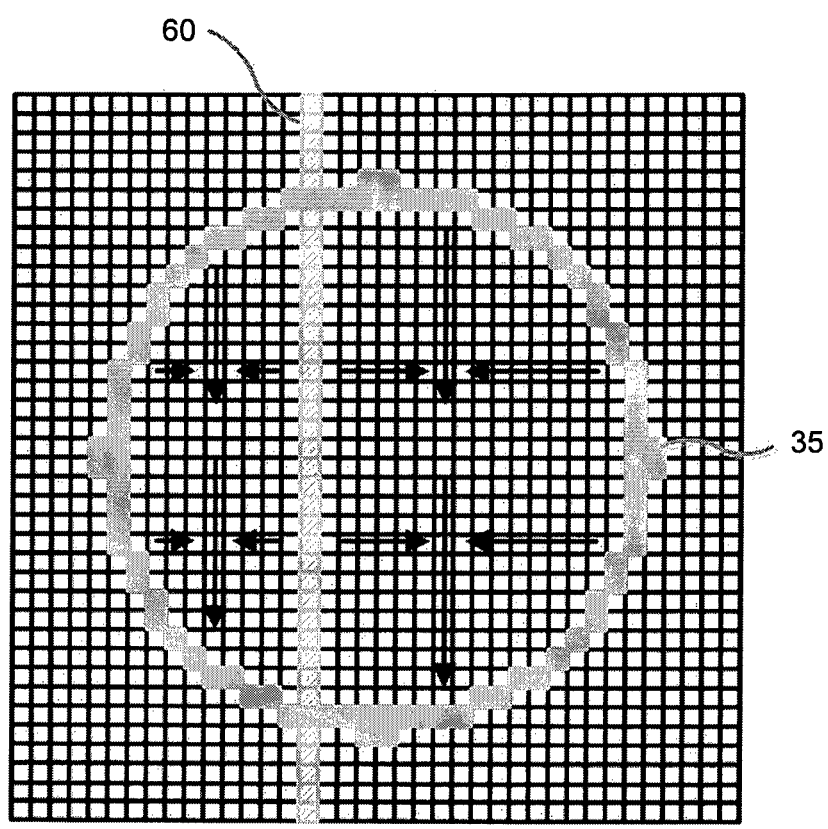
FIG. 25 is a diagram describing interpolation between the amounts of correction at step S1430 described in FIG. 14.

Referring to FIG. 24, the amounts of correction to the evaluation sections on the inside of the overlapping region are calculated by interpolation toward the interpolation reference region from four directions. Alternatively, the amounts of correction may be calculated by interpolation from a specific direction. The amounts of correction are to be calculated from a specific direction in such a case where an obstacle exists in the overlapping region or some problem may occur with uniform interpolation. In the diagonally shaded region illustrated in FIG. 25, an interpolation reference region 60 is vertically extended, and a value indicating no correction is stored in the interpolation reference region 60. Accordingly, the region on the inside of the overlapping region is divided into two by the interpolation reference region 60. The amounts of correction can be calculated for each of the divided regions by weighted averaging as expressed in Equations (6) and (7). Alternatively, the amounts of correction may be calculated by the use of Equations (8) and (9).

The overlapping regions with a high matching degree include the images of the same subject, and thus are of high reliability in image connection. On the other hand, the overlapping regions with a low matching degree include the images of difference subjects and thus are of low reliability in image connection. Accordingly, erroneous values are likely to be calculated in the overlapping regions with a low matching degree even when the amounts of correction are calculated.

Figure 26:
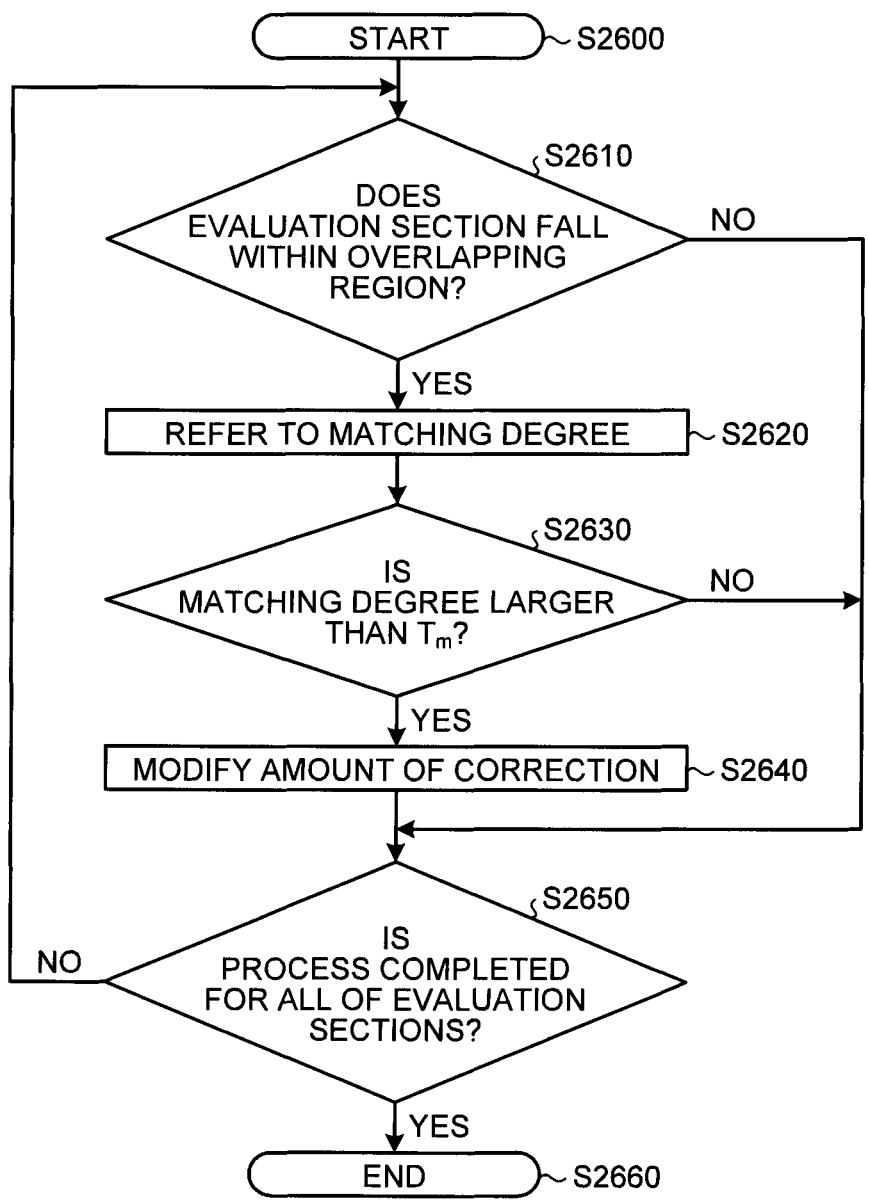
FIG. 26 is a flowchart of a process for modifying the amounts of correction in the overlapping region.

Referring to FIG. 26, a process for correcting the amounts of correction to the overlapping region based on matching degrees will be described. This correction can be made after calculation of the amounts of correction to the overlapping region at step S1420 described in FIG. 14. Prior to starting the process, the threshold $T_m$ is set for the matching degree.

This process is started at step S2600. At step S2610, it is determined whether the evaluation section falls within the overlapping region. When the evaluation section does not fall within the overlapping region, no correction is made to the amount of correction to the evaluation section and the process is moved to step S2650. When the evaluation section falls within the overlapping region, the process is moved to step S2620 to refer to the matching degree of the evaluation section. When no matching degree has been calculated, the matching degree is calculated by the method described above.

At step S2630, it is determined whether the referred matching degree is larger than the preset threshold $T_m$ for matching degree. When the matching degree is smaller than the threshold $T_m$, no correction is made to the amount of correction to the evaluation section and the process is moved to step S2650. In contrast, when the matching degree is larger than the threshold $T_m$, the process is moved to step S2640 to make correction to the amount of correction to the evaluation section. At that time, the amount of correction to the evaluation section is corrected such that no correction is made. Specifically, when the amount of correction is represented by the ratio between evaluation values described above, the amount of correction is corrected to "1.0", and when the amount of correction is represented by the difference between the evaluation values, the amount of correction is corrected to "0".

At step S2650, it is determined whether the process is completed for all of the evaluation sections. When the process is not yet completed for all of the evaluation sections, the process is returned to step S2610 to perform the same process on the next evaluation section. When the process is completed, the process is moved to step S2660 and terminated.

At the calculation of the amounts of correction to the overlapping region at step S1420 described in FIG. 14, some of the calculated amounts of correction may take unintended values. For example, such an event occurs in the case where there are no images of the same subject between the overlapping regions in the images to be connected or in the case where there is an extremely difference in brightness between the overlapping regions in the images to be connected. In such cases, a process for limiting the amounts of correction can be performed to keep the amounts of correction within a predetermined range not so as to be extremely large or small.

Figure 27:
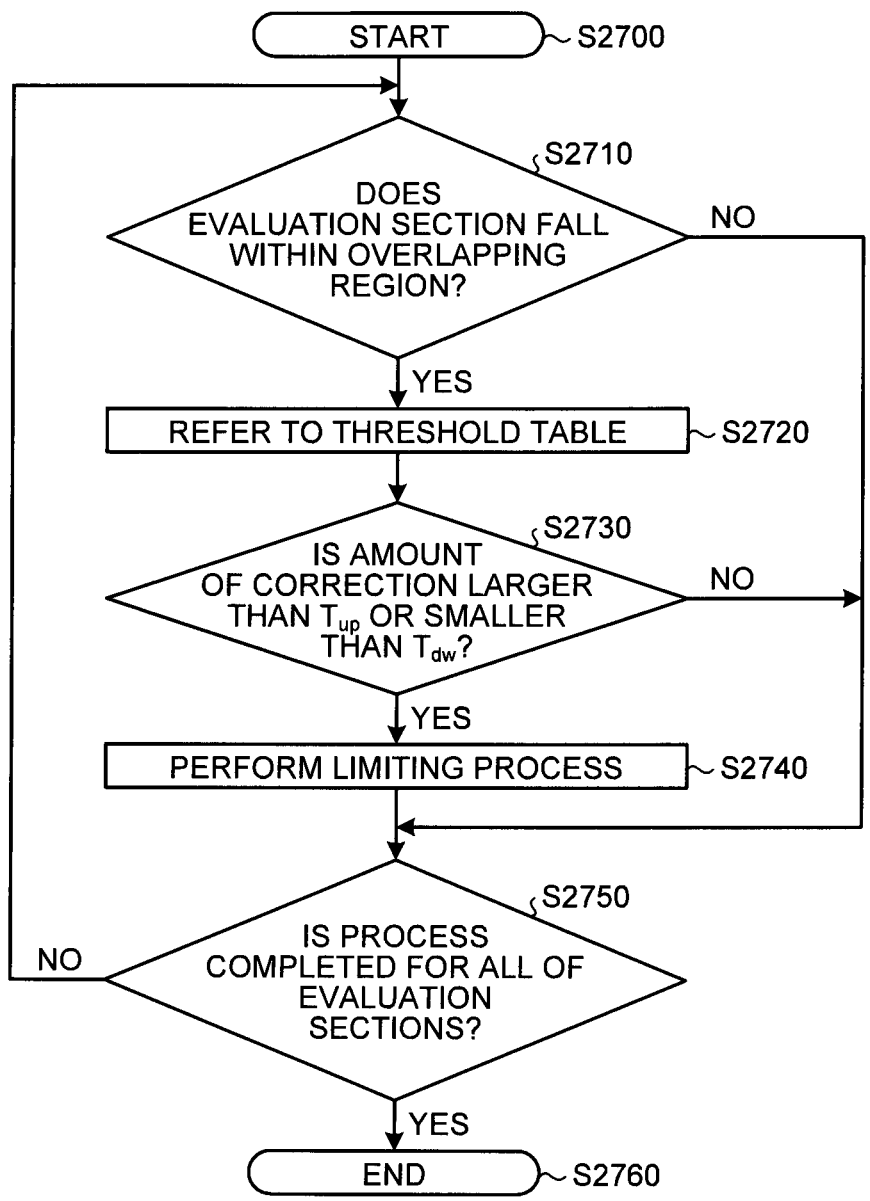
FIG. 27 is a flowchart of a process for limiting the amounts of correction in the overlapping region.

Referring to FIG. 27, the limiting process will be described. The limiting process can be performed after the calculation of the amounts of correction to the overlapping region at step S1420 or after the calculation of the amounts of correction by interpolation at step S1430 described in FIG. 14. Prior to starting the limiting process, a threshold table showing the relationship between the pixel values of the flare image and the thresholds for the limiting process is prepared.

The threshold table may represent a graph as illustrated in (a) or (b) in FIG. 28, or may represent a table holding numerical values from the graphs, for example. In FIG. 28, (a) shows a table in which the amounts of correction are the ratios between evaluation values, and (b) shows a table in which the amounts of correction are the differences in evaluation value. In the threshold table, an upper limit $T_{up}$ and a lower limit $T_{dw}$ are determined as thresholds in correspondence with signal amounts as pixel values of the flare image.

When the signal amount of the flare image is designated as s and the signal amount of allowance for correction is designated as a, the upper limit $T_{up}$ and the lower limit $T_{dw}$ in (a) in FIG. 28 can be expressed by the following Equations (10) and (11).

$$T_{up} = \frac{s+a}{s} \quad (10)$$

$$T_{dw} = \frac{s-a}{s} \quad (11)$$

When the signal amount of the flare image is designated as s and the signal amount of allowance for correction is designated as a, the upper limit $T_{up}$ and the lower limit $T_{dw}$ in (b) in FIG. 28 can be expressed by the following Equations (12) and (13).

$$T_{up} = a \quad (12)$$

$$T_{dw} = -a \quad (13)$$

This process is started at step S2700. At step S2710, it is determined whether the evaluation section falls within the overlapping region. When the evaluation section does not fall within the overlapping region, no correction is made to the amount of correction to the evaluation section and the process is moved to step S2750. When the evaluation section falls within the overlapping region, the process is moved to step S2720 to refer to the threshold table illustrated in FIG. 28 to acquire the thresholds $T_{up}$ and $T_{dw}$ for the amount of correction. The thresholds $T_{up}$ and $T_{dw}$ can be calculated by Equations (10) and (11) or Equations (12) and (13).

At step S2730, it is determined whether the amount of correction to the evaluation section is larger than the upper limit $T_{up}$ or is smaller than the lower limit $T_{dw}$ in the threshold table. When the amount of correction is larger than the upper limit $T_{up}$ or is smaller than the lower limit $T_{dw}$, the limiting process is not performed on the amount of correction to the evaluation section and the process is moved to step S2750. In contrast, when the amount of correction is the same as or smaller than the upper limit $T_{up}$ or is the same as or larger than the lower limit $T_{dw}$, the process is moved to step S2740 to perform the limiting process on the amount of correction to the evaluation section.

The limiting process is intended to correct the amount of correction to the evaluation section such that no correction is made. Specifically, when the amount of correction is represented by the ratio between evaluation values as described above, the amount of correction is corrected to "1.0", and when the amount of correction is represented by the difference in evaluation value as described above, the amount of correction is corrected to "0".

At step S2750, it is determined whether the process is completed for all of the evaluation sections. When the process is not yet completed for all of the evaluation sections, the process is returned to step S2710 to perform the same process on the next evaluation section. When the process is completed, the process is moved to step S2760 and terminated.

As described above, an embodiment according to the present invention allows appropriate correction to be made to the image even with occurrence of a flare. At the time of correction, the image with the lowest probability of occurrence of a flare is set as a correction reference image, and the other images are corrected. In addition, the average values with low matching degrees (the average values with high matching degrees in the case of Equations (4) and (5)) are not generally subjected to summation, and therefore the average value in the overlapping region can be calculated using only the average values with high correlation between the flare image and the correction reference image. Even if an extremely bright subject such as a light source or an extremely dark subject is reflected, the average value in the overlapping region is calculated without the use of the average values in the image of such a subject. This reduces influence on the calculation of an average value in the overlapping region.

Performing the limiting process makes it possible to prevent that correction is made by an extremely large amount of correction. Performing the leveling process makes it possible to prevent that excessive correction is partly made. Performing the resizing process on the correction map allows correction to be made by pixel-based arithmetic operations, which eliminates the need for complicated conversion in the correction map. Calculating the amounts of correction to all of the evaluation sections by weighted averaging makes it possible to prevent differences in signal level representing differences in brightness or color in the image from being caused by the correction, which realizes natural correction. The amounts of correction are calculated by the ratios or differences as described above, which causes no difference in signal level at the time of correction.

The embodiment of an image processing system and an image processing method is described above. However, the present invention is not limited to the foregoing embodiment. The present invention may be modified by replacement with another embodiment, or any other mode such as addition, changing, or deletion, as far as persons skilled in the art can perceive it. Any aspect of modification is included in the scope of the present invention as far as the modification can produce the effects and advantages of the present invention. Therefore, the present invention makes it possible to provide a program for causing a computer to execute an image processing method, a computer-readable storage medium with the program stored thereon, a server device providing the program via a network, and the like.

According to the embodiment described above, it is possible to reduce differences in brightness and color between a plurality of images to be combined.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An image processing system for performing image processing on a plurality of images including overlapping image regions as overlapping regions, the image processing system comprising:

circuitry configured to
  calculate, for each image of the plurality of images, an evaluation value for the image using pixel values of one or more pixels in each of the overlapping regions, so as to calculate a plurality of evaluation values;
  determine, based on the calculated evaluation values of the plurality of images, whether there is an image to be corrected among the plurality of images;
  when determining that there is the image to be corrected, determine an identity of the image to be corrected and determine a correction reference image as a reference for correction, out of the plurality of images, based on the calculated evaluation values, the correction reference image being different than the image to be corrected; and
  correct the image to be corrected based on the determined correction reference image, wherein
to calculate each evaluation value of the plurality of evaluation values, the circuitry is further configured to
  divide a corresponding image of the plurality of images into a plurality of evaluation sections,
  average pixel values of a plurality of pixels in each of the evaluation sections to calculate an average value of each evaluation section, excluding average values that are larger than an upper limit value or smaller than a lower limit value,
  detect a second plurality of evaluation sections included in the overlapping regions, and
  calculate the evaluation value by averaging the average pixel values for the second plurality of evaluation sections.

2. The image processing system according to claim 1, wherein the circuitry is further configured to
  determine a correction exclusion section to which no correction is to be made in the image to be corrected, using pixel values of a plurality of pixels in the image to be corrected, and
  correct sections of the image to be corrected except for the determined correction exclusion section.

3. The image processing system according to claim 1, wherein the circuitry is further configured to determine an image with a smallest evaluation value as the correction reference image and determine, as the image to be corrected, one or more images out of the plurality of images except for the correction reference image.

4. The image processing system according to claim 1, wherein the circuitry is further configured to
  calculate a degree of coincidence between an image of each of the evaluation sections included in the overlapping region of the correction reference image and an image of each of the evaluation sections included in the overlapping region of the image to be corrected, and
  calculate the evaluation value with exclusion of the average value in the evaluation section having the coincidence degree smaller than a preset coincidence degree threshold.

5. The image processing system according to claim 1, wherein the circuitry is further configured to hold the upper limit value and the lower limit value.

6. The image processing system according to claim 1, wherein the circuitry is further configured to
  calculate, by using the evaluation value of the correction reference image and the evaluation value of the image to be corrected, amounts of correction to the plurality of evaluation sections included in the overlapping region of the image to be corrected,
  calculate, by using the amounts of correction to the plurality of evaluation sections, amounts of correction to evaluation sections other than the plurality of evaluation sections included in the overlapping region, and
  correct the image to be corrected by using the calculated amounts of correction.

7. The image processing system according to claim 6, wherein
  the circuitry is further configured to hold a correction amount threshold for the amounts of correction to the plurality of evaluation sections included in the overlapping region, and
  when any amount of correction to one or more evaluation sections exceeding the correction amount threshold, out of the plurality of evaluation sections is calculated, the circuitry is further configured to change the calculated amount of correction such that no correction is made to the one or more evaluation sections.

8. The image processing system according to claim 6, wherein
  the circuitry is further configured to refer to a degree of coincidence between an image of each of the evaluation sections included in the overlapping region of the correction reference image and an image of each of the evaluation sections included in the overlapping region of the image to be corrected, and
  when the degree of coincidence is smaller than a preset coincidence degree threshold, the circuitry is further configured to change the calculated amount of correction to the evaluation section having the smaller degree of coincidence to an amount of correction that results in no correction being made to the evaluation section.

9. The image processing system according to claim 6, wherein the circuitry is further configured to calculate the amounts of correction as ratios between the evaluation value in the overlapping region of the correction reference image and the evaluation value in the overlapping region of the image to be corrected.

10. The image processing system according to claim 6, wherein the amounts of correction are calculated by the circuitry as differences between the evaluation value in the overlapping region of the correction reference image and the evaluation value in the overlapping region of the image to be corrected.

11. The image processing system according to claim 6, wherein the circuitry is further configured to calculate the amounts of correction to evaluation sections other than the plurality of evaluation sections included in the overlapping region, by weighted averaging with distances between the evaluation sections to which the amounts of correction are calculated and the plurality of evaluation sections included in the overlapping region as weights.

12. The image processing system according to claim 6, wherein the circuitry is further configured to create a correction map in which the calculated amounts of correction are stored at positions corresponding to each of the evaluation sections of the image to be corrected, and make correction to the image to be corrected with application of the correction map.

13. The image processing system according to claim 12, wherein the circuitry is further configured to modify the created correction map with the use of a correction exclusion map in which a value indicative of exclusion from correction is stored at positions to evaluation sections included in a correction exclusion section where no correction is to be made in the image to be corrected, determined according to pixel values of a plurality of pixels constituting the image to be corrected, and make correction to the image to be corrected with application of the modified correction map.

14. The image processing system according to claim 12, wherein the circuitry is further configured to perform a leveling process on the correction map.

15. The image processing system according to claim 12, wherein the circuitry is further configured to change the number of evaluation sections held in the correction map to the number of pixels of the image to be corrected.

16. An imaging apparatus, comprising:
a plurality of imaging elements; and
an image processing system configured to perform image processing on a plurality of images including overlapping image regions as overlapping regions taken by the plurality of imaging elements, wherein
the image processing system includes circuitry configured to
calculate, for each image of the plurality of images, an evaluation value for the image using pixel values of one or more pixels in each of the overlapping regions, so as to calculate a plurality of evaluation values;
determine, based on the calculated evaluation values of the plurality of images, whether there is an image to be corrected among the plurality of images;
when determining that there is the image to be corrected, determine an identity of the image to be corrected and determine a correction reference image as a reference for correction, out of the plurality of images, based on the calculated evaluation values, the correction reference image being different than the image to be corrected; and
correct the image to be corrected based on the determined correction reference image, wherein
to calculate each evaluation value of the plurality of evaluation values, the circuitry is further configured to
divide a corresponding image of the plurality of images into a plurality of evaluation sections,
average pixel values of a plurality of pixels in each of the evaluation sections to calculate an average value of each evaluation section, excluding average values that are larger than an upper limit value or smaller than a lower limit value,
detect a second plurality of evaluation sections included in the overlapping regions, and
calculate the evaluation value by averaging the average pixel values for the second plurality of evaluation sections.

17. An image processing method performed in an image processing system for performing image processing on a plurality of images including overlapping image regions as overlapping regions, the image processing method comprising:
calculating, for each image of the plurality of images, an evaluation value for the image using pixel values of one or more pixels in each of the overlapping regions so as to calculate a plurality of evaluation values;
first determining, based on the calculated evaluation values of the plurality of images, whether there is an image to be corrected among the plurality of images;
second determining, when the first determining indicates that there is the image to be corrected, an identity of the image to be corrected and a correction reference image as a reference for correction, out of the plurality of images, based on the calculated evaluation values, the correction reference image being different than the image to be corrected; and
correcting the image to be corrected based on the determined correction reference image, wherein
for each evaluation value of the plurality of evaluation values, the calculating includes
dividing a corresponding image of the plurality of images into a plurality of evaluation sections,
averaging pixel values of a plurality of pixels in each of the evaluation sections to calculate an average value of each evaluation section, excluding average values that are larger than an upper limit value or smaller than a lower limit value,
detecting a second plurality of evaluation sections included in the overlapping regions, and
calculating the evaluation value by averaging the average pixel values for the second plurality of evaluation sections.

18. A non-transitory computer-readable storage medium with an executable program stored thereon, wherein the program instructs a computer to perform the image processing method according to claim 17.

\* \* \* \* \*